Oct. 5, 1965  G. T. RANDOL  3,209,657
PRESSURE DIFFERENTIAL OPERATED BRAKE BOOSTER DEVICE
Filed Sept. 21, 1962  5 Sheets-Sheet 1

Inventor

Oct. 5, 1965  G. T. RANDOL  3,209,657
PRESSURE DIFFERENTIAL OPERATED BRAKE BOOSTER DEVICE
Filed Sept. 21, 1962  5 Sheets-Sheet 2

Inventor

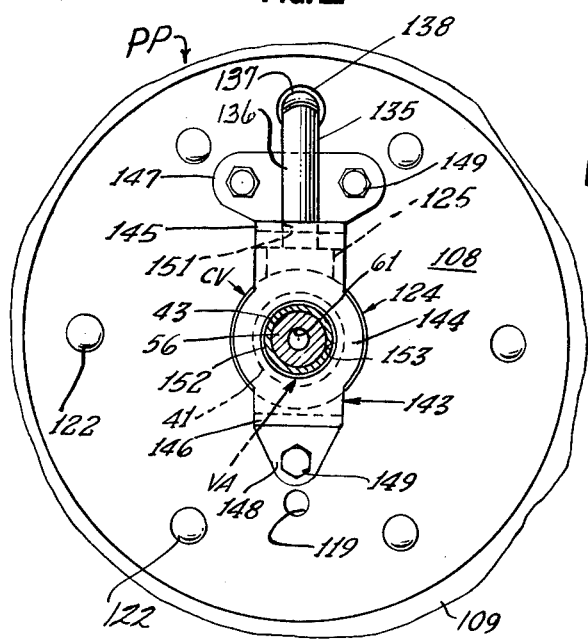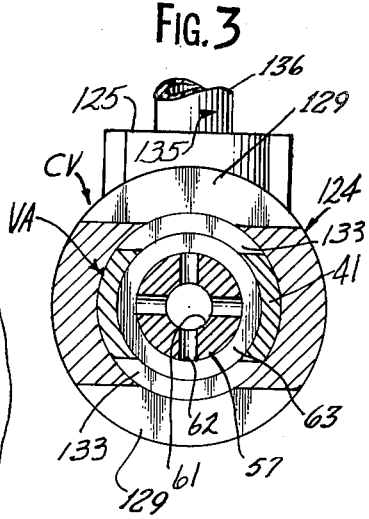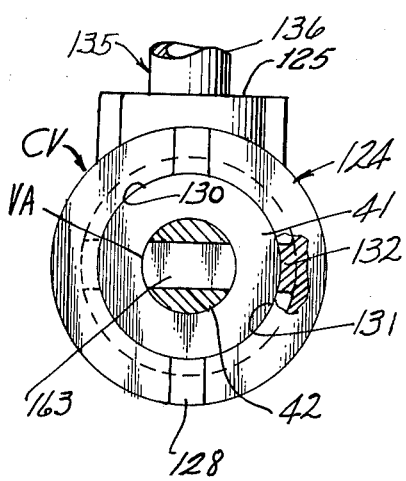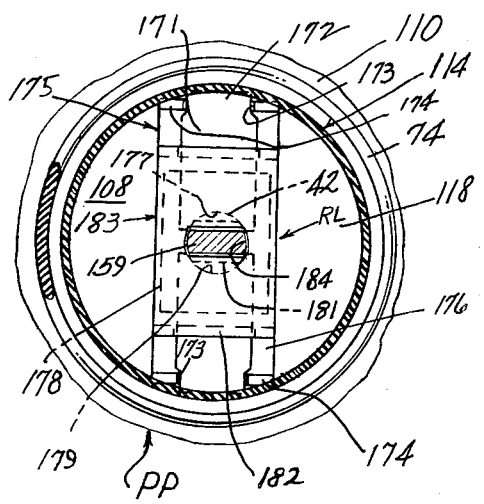

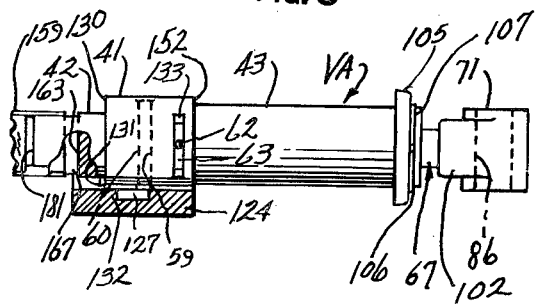
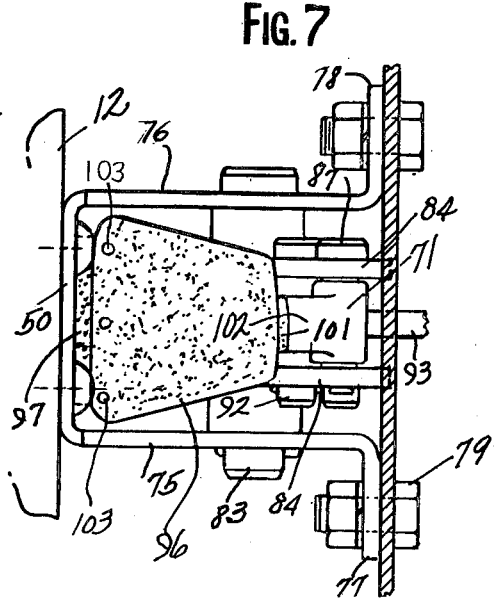
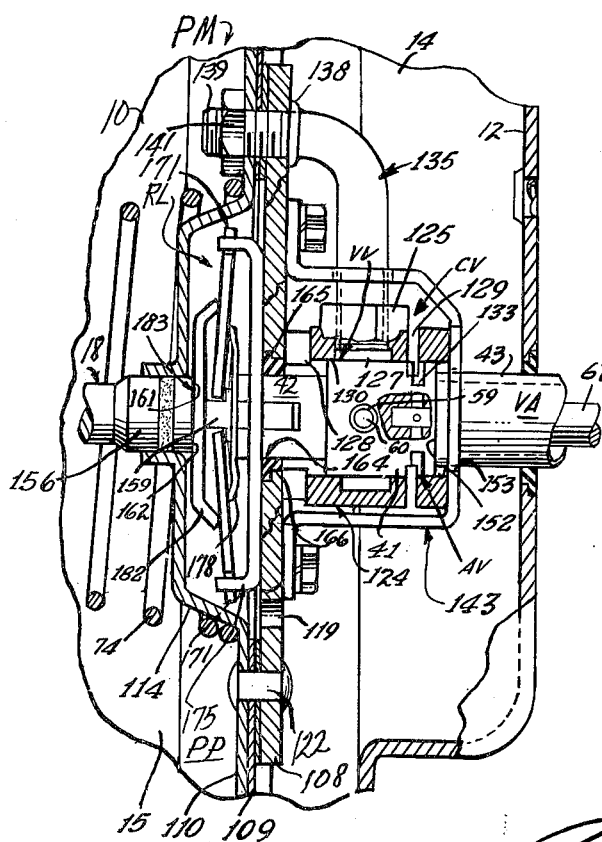
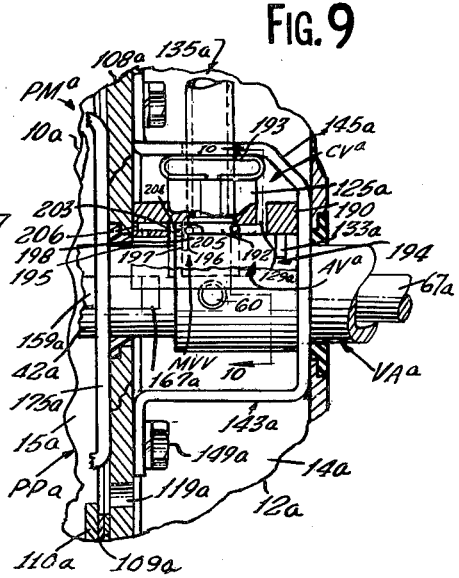

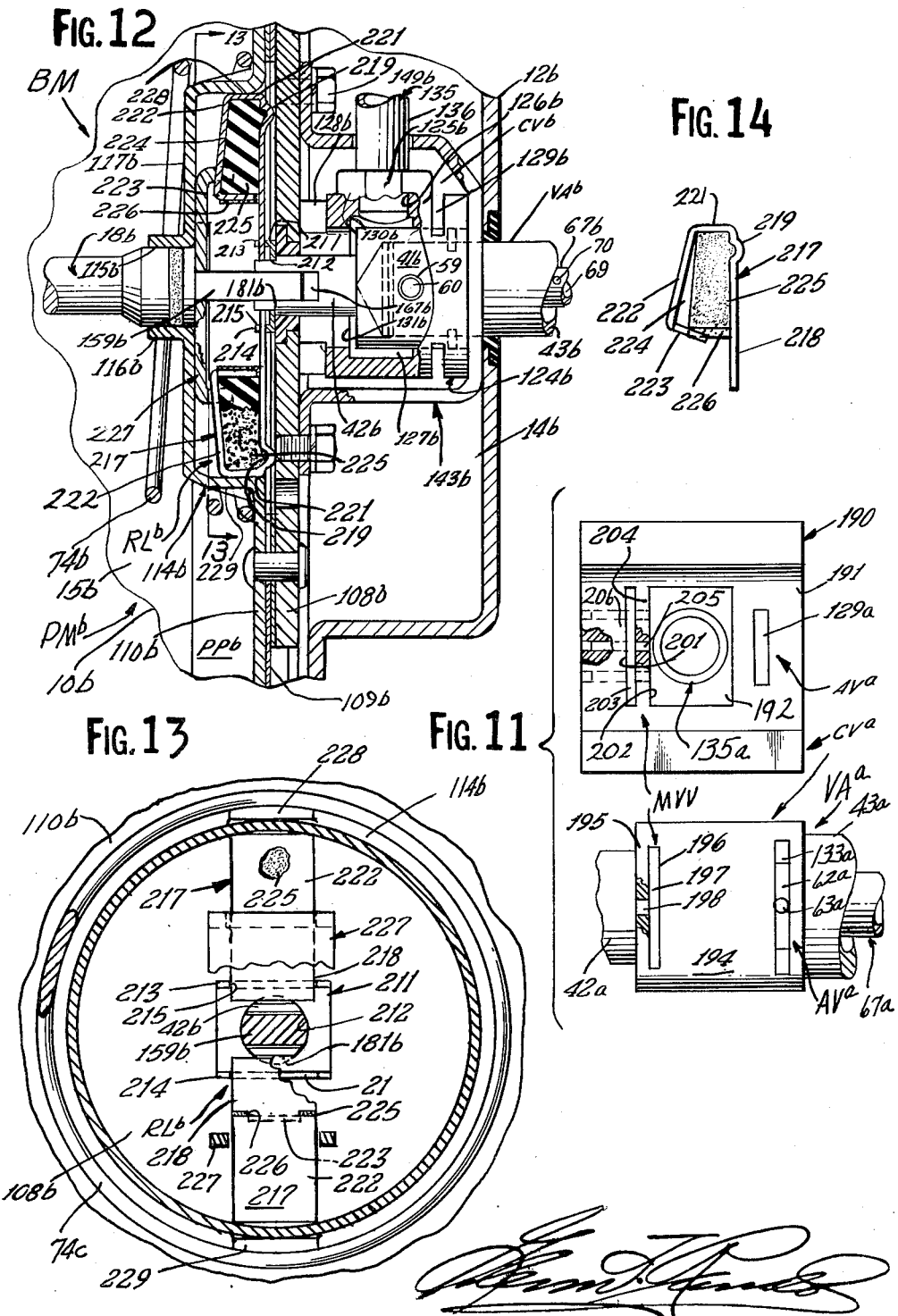

United States Patent Office 3,209,657
Patented Oct. 5, 1965

3,209,657
PRESSURE DIFFERENTIAL OPERATED BRAKE BOOSTER DEVICE
Glenn T. Randol, 3 E. 2nd Ave., Loch Lynn,
Mountain Lake Park, Md.
Filed Sept. 21, 1962, Ser. No. 225,427
17 Claims. (Cl. 91—369)

My invention relates to a power unit for brake systems, adapted for providing the major portion of the operating force to apply the brakes, said unit being characterized by novel control means through which operator force may be combined with the power force, or utilized independently thereof, to actuate the conventional master brake cylinder of hydraulic brake systems on motor vehicles and the like, to effect brake applications.

The primary object of the invention is to provide an improved power unit of the character referred to, which incorporates novel and improved valve mechanism for controlling the movable power assembly in such power units, said mechanism including a pair of telescopically-related cylindrical elements movable relatively from normal disposition wherein opposite sides of the power assembly are subjected to equivalent negative (vacuum) pressures, to operating disposition to raise the pressure on one side of the power assembly and thereby create differential pressures on opposite sides thereof to activate said assembly. An important object is to loosely confine the outer valve element longitudinally between one side of the power assembly and a bracket member secured to the assembly to enable the latter and outer valve element to move axially as a unit while accommodating slight radial compensating deflection of said element with respect to the axis of movement of the inner valve element which passes through said outer valve element in airtight sealed relation, with the inner end portion thereof projecting through the power assembly, thus enabling the outer valve element to compensate for any deflections of the inner valve element when under operator-actuation to avoid uneven wear between the working surfaces of the valve elements resulting from disalignment or other angulating forces inherent with operative energization of the power unit, or when the operator assists the power unit or operates the vehicle brakes independently of the power unit.

An object related to the object next above is to extend the service life of the control valve mechanism by providing an outer valve element which moves axially as a unit with the power assembly, with limited radial movement as a unit with the inner valve element in the event the latter element is forced under operator-actuation out of a straight-line of movement. Such unison movement of the valve elements imposes no radial forces on the delicate working surfaces therebetween, therefore, the "lapped" fit between these surfaces, would actually improve with use to maintain an airtight seal therebetween for long service life of this principal component in power units of the type under consideration.

Another object of special importance related to the object immediately preceding, is to provide such a control valve characterized by a relatively small unitary assembly, yet the porting therein may be sufficiently capacitated without unduly inceasing the relative operating movement between said valve elements to enable rapid excursion and incursion of air for sensitive activation and inactivation, respectively, of the power unit.

Another object is to produce novel and improved control valve mechanism adapted for controlling a power member movable by a pressure differential, that may be made of a molded element such as plastic material and which slidably cooperates with another element movable as a unit with a valve actuator connected at one end to an operator-operated member such as the conventional suspended-type brake pedal. The other end of the valve actuator projects through a central aperture in the power member to operatively act on a lever-type reaction mechanism which serves to transmit operator and power forces proportionally to a work element for moving the piston in the associated master brake cylinder of conventional construction and operation, said valve actuator having the additional function of engaging the work element to transmit operator force directly to either cooperate with the power force, or to enable operator force alone to operate the master cylinder in the event of complete failure of the power unit.

The novel construction of the present power unit is designed for fabrication for the most part from sheet metal "stamping" for economy, weight reduction and ease of assembly, thus making power-braking available for the first time to the mass of automobile owners as well as being equally suitable for original equipment by the car manufacturers, since its less weight and cost plus unexcelled operating efficiency make it suitable for all sizes of motor vehicles, within a price range to induce car owners to use this "safety" device, which no car operating on our modern highways should be without.

Another object of the invention is to provide novel spring-biased sealing means at the point where the valve actuator projects from the power unit for connection to the pedal operated linkage, and wherein said spring-bias is effective to retract said valve actuator toward its normal position in opposition to operation of said pedal linkage.

A modified form of the control valve mechanism is disclosed herein, and which utilizes only the upper half of the "floating" outer valve element maintained in airtight sealed relation with the associated portion of the inner valve element under joint influence of spring and differential fluid pressures. This modified form of the invention effects further economy and simplification of the structure without impairing the sensitivity of control over the associated power member. It is contemplated that the porting areas may be sufficiently capacitated to prevent undue restriction of air flow therethrough, by utilizing a plurality of vacuum-control ports in the semi-circular element selectively controllable by a similar plurality of lands incorporated on the inner valve element forming part of the valve actuator.

Another modification of the present invention provides a novel and improved reaction-transmitting mechanism wherein lever-action is combined in a novel manner with a resilient element in a plurality of radially disposed levers to produce a progressively increasing resistance to brake-pedal and power-member movements as a function of reaction from the master brake cylinder whereby the operator is provided with a highly desirable pedal "feel" to enable him to predictably regulate the degree of braking force required.

Still another modification disclosed herein provides a novel valve actuator and inner valve element formed from a single piece of bar stock for simplification of the porting therein, and connection to the pedal push-rod to facilitate production and assembly.

Additional objects and advantages of the present invention will become apparent from the following description, reference being had to the accompanying drawings wherein four embodiments of the invention are exemplarily illustrated as follows:

FIGURE 2 is a transverse section taken along the line 2—2 of FIGURE 1A showing the right side of the power-piston assembly and associated portions of the control valve;

FIGURE 3 is another transverse section taken on an enlarged scale along the line 3—3 of FIGURE 1A showing details of the vacuum inlet and air passage system incorporated in the control valve;

FIGURE 4 is another transverse section taken on an enlarged scale along line 4—4 of FIGURE 1A showing the forward end of the control valve and plurality of vacuum transfer cross-slots indented in the forward end of the outer valve element;

FIGURE 5 is another transverse section taken on the line 5—5 of FIGURE 1A showing the left side of the power-piston assembly and associated lever-type reaction-transmitting means;

FIGURE 6 is a view of the valve actuator which includes the inner valve element;

FIGURE 7 is a plan view of the booster motor mounting bracket assembly and associated working parts, shown attached to the forward (engine) side of the vehicle firewall;

FIGURE 8 is a fragmentary reproduction of FIGURE 1 similar to FIGURE 1A, but showing the control valve mechanism and associated working parts in relatively adjusted positions corresponding to an operating status of the booster motor;

FIGURE 9 is another fragmentary view taken from FIGURE 1 on the same scale, and showing a modified form of the control valve assembly;

FIGURE 11 is a view of the complemental working surfaces between the two valve elements of FIGURE 9, to clarify the interconnecting passages for the pair of vacuum channels and the dual-working lands adapted to control said channels;

FIGURE 12 illustrates a modified reaction-transmitting mechanism wherein lever-action is combined in a novel manner with resilient means;

FIGURE 13 is a transverse section taken along the line 13—13 of FIGURE 12 modification to show further particulars of the reaction-levers;

FIGURE 14 is a view of one of the modified reaction-levers per se in assembled status prior to installation.

Figure 1:
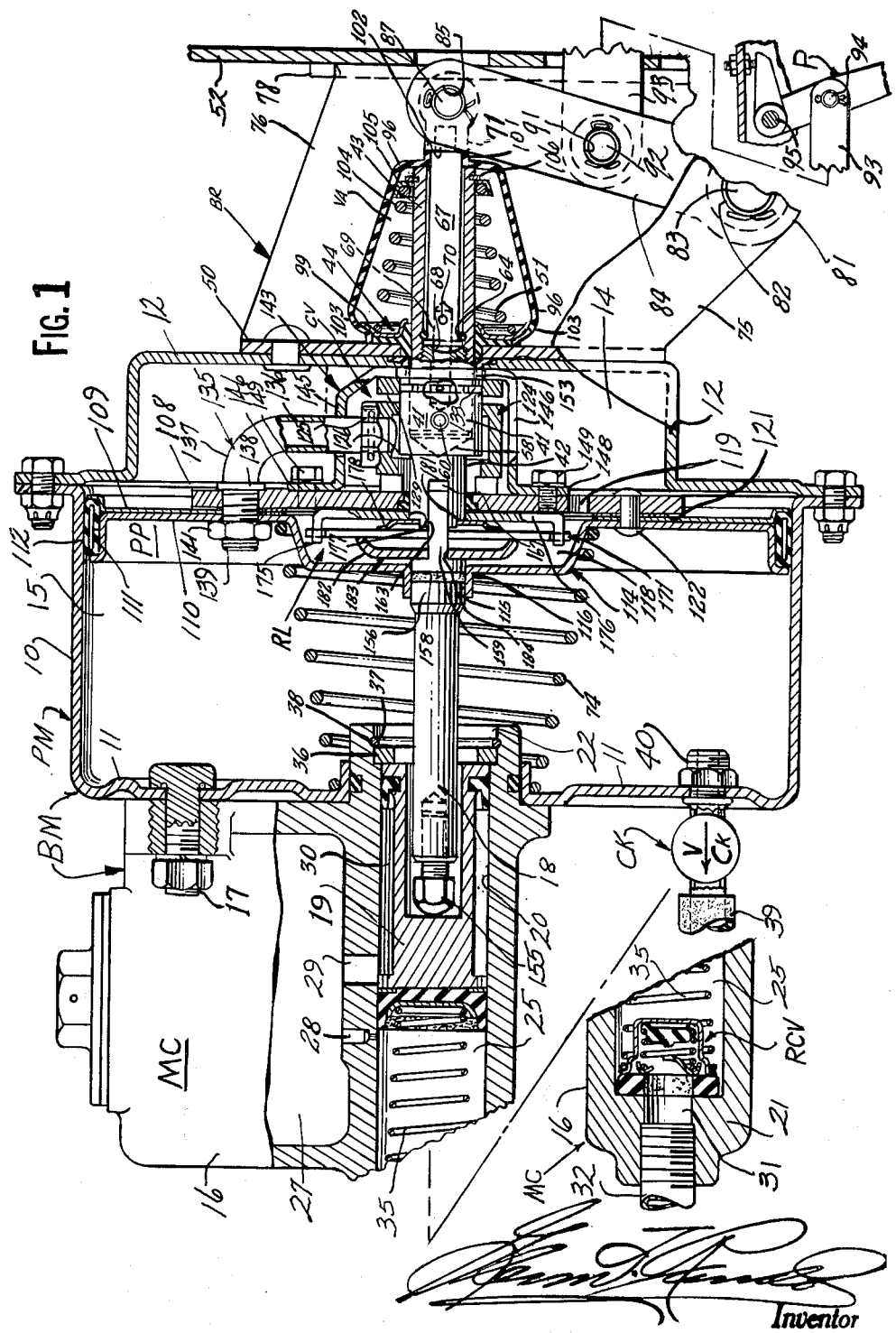
FIGURE 1 is a vertical longitudinal section of my novel booster brake unit constructed in accordance with the present invention, said unit being shown in normally released condition wherein the vehicle brakes (not shown) are "off"

Referring now to the drawings, the power unit of the present invention is disclosed as a pressure-differential operated motor generally designated "PM" that comprises a cup-shaped casing or cylinder 10 having an integral end wall 11 and a detachable cup-shaped member (wall) 12 closes its open end as shown. A power assembly is reciprocably mounted within said power cylinder and moves from a normally released position depicted in FIGURES 1 and 1A, and is generally designated "PP," said assembly being preferably of the solid-piston type as distinguished from the flexible-diaphragm types. The power assembly which for flexibility in terminology in describing and claiming my invention will be referred to as a "power-piston," "power member" or "wall" or "pressure-responsive unit," divides the interior of the power cylinder into a variable pressure (air-vacuum) chamber 14 and a constant negative pressure (vacuum) chamber 15, both of said chambers being normally balanced at negative level pressure when the power-piston PP is in normal position, thus the present booster motor PM is commercially designated the vacuum-suspended type as distinguished from the air-suspended types characterized by equivalent atmospheric pressure conditions in both chambers when the booster motor is de-energized. The conventional master brake cylinder designated "MC" is provided with a body 16 mounted on the end wall 11 of the power cylinder 10 in airtight sealed relation therto, as by a plurality of bolts 17 as shown, said master cylinder supplying the pressurized fluid to the vehicle brake system to actuate the same.

Therefore, the booster brake mechanism designated as a whole "BM" comprises the booster motor PM and the aforesaid conventional master cylinder MC in a unitary assembly.

The power-piston assembly PP actuates a work-performing member disclosed herein as a booster push-rod 18 that has its forward axially adjustable end projecting into engagement with the bottom of a cavity in a spool-type hydraulic piston 19 slidably disposed in a longitudinal bore 20 formed in the master cylinder body 16, said bore being closed at its forward end 21 and open at its opposite (rear) end 22 whereby coaction between the piston 19 and power-piston PP effects the major portion of the application of pressure on the brake fluid in a variable volume working chamber 25 disposed between the closed end 21 of said bore 20 and the confronting head 26 terminating the forward end portion of the hydraulic piston 19, to supply brake actuating fluid under pressure to the brake system of the motor vehicle as is understood.

A hydraulic fluid reservoir 27 is provided in the master cylinder body 16 to supply fluid under gravitional force to said bore 20 via a compensating port 28 controlled by the head of the piston 19, and an inlet port 29 in continuous communication with an annular fluid chamber 30 encircling said piston 19 to enable adjustment of fluid volume in said working chamber 25 to accommodate full release of the vehicle brakes without cavitating the brake lines.

Hydraulic fluid under pressure is discharged from the working chamber 25 of the master cylinder through a discharge opening (outlet) 31, and a residual pressure and discharge check-valve assembly generally designated "RCV" of conventional construction and operation, into the pressure lines 32 leading to the wheel cylinders (not shown) provided in the brakes (not shown) for each of the wheels of the motor vehicle.

A normally preloaded compression spring 35 is disposed in the hydraulic working chamber 25 to react between the residual pressure check valve RCV and the master cylinder piston 19 to urge the latter into normally released position wherein said compensating port 28 is open (uncovered) to accommodate fluid flow between the working chamber and reservoir, and the piston 19 engages a backing washer 36 held from displacement by a split abutment ring 37 partially confined in an internal annular groove 38 adjacent the open end of said bore 20.

Actuation of the power-piston PP is controlled by operation of a novel and improved follow-up control valve mechanism generally designated "CV," to selectively connect one side (variable power chamber 14) of the power-piston to atmosphere and to the other chamber 15 which is continuously charged with vacuum (negative) pressure, the latter chamber being connected at all times by conduit 39 having an interposed check-valve generally designated "CK" and a rigid tubular fitting 40 projecting from the end wall 11 of the power cylinder 10, to a source of vacuum production such as, for example, vacuum conditions created within the inlet-manifold of an operating internal-combustion engine powering any conventional motor vehicle or the like. The control valve CV is operative in closely calibrated follow-up sequential steps by an elongated valve actuator disclosed herein as a valve-carrying unit of composite construction and characterized by rectilinear movement, and which is designated as a whole by the reference character "VA". The said valve actuator is a horizontally disposed member of circular cross section and comprises an intermediate enlarged diameter valvular portion 41 to provide an inner valve element more specifically designated a "valve piston," and a reduced diameter portion 42 which projects forwardly therefrom, and another reduced diameter tubular portion 43 projecting from the opposite (rear) end of the valvular portion, said forward reduced portion being produced by diminishing the diameter of the valvular portion 41. The reduced portion 42 and the intermediate valvular portion 41 lie wholly within the variable pressure chamber 14 while the tubular extension 43 projects rearwardly from the valvular portion through a synthetic annular bearing fixed in an opening through the central portion of the closure member 12 by means of an offset annular flange on the bering confined in a complemental marginal recess defining said opening best shown in FIGURE 1A. Another opening coaxial with respect to and of the same diameter as the opening through said bearing, is provided by an annular pliant seal 44 of novel construction having a pair of oppositely disposed annular sealing lips 45,46 formed with outer tapered surfaces, resectively, for an important purpose to apear. Thus, the tubular extension 43 is slidably supported on the bearing aforesaid and projects through the the opening in the seal and thence through a circular aperture 47 complemental to the opening through said bearing, in a coaxially disposed pressure-applying plate 48 which overlies the outer face of the seal 44 as shown, in the same configuration therewith and contiguously thereto, said backing plate having the dual novel functions of stabilizing the seal in sealing position around the exterior of the actuator extension 43, and of exerting both axially directed pressure on the seal proper and radially inwardly biasing force on the inner lip 45 to supplement the sealing action of the outer lip 46, such pressures transmitted by the backing plate against the seal 44 being adapted to maintain both lips of the seal in effective sealing relationship waith the exterior of the actuator portion 43 without unduly resisting rectilinear movement of the valve actuator VA under operator-actuation as will appear. The tapered surface on the inner lip cooperates with a complemental tapered surface defining a circular opening 49 through a connecting segment 50 of a mounting bracket assembly designated "BR," said segment lying between the wall 12 and backing plate 48. It is the coaction between the complemental tapered surfaces of the opening 49 and inner lip 45 and the tapered surface on the outer lip acted on by a complemental annular flange 51 defining the aperture 47 in the backing plate 48 that bias the lips radially inwardly in airtight sealing relationship around the exterior cylindrical surface of the actuator extension 43 to seal off the variable pressure chamber 14 from the exterior of the power cylinder 10 except as dictated by relative positions of the control valve CV.

The mounting bracket BR is mounted on the closure wall 12 as by a plurality of rivets which passes through the segment 50 as shown in FIGURES 1 and 7, to mount the booster brake unit BM in operating position on the vehicle, preferably on the firewall 52 thereof in the engine compartment for accessibility.

The forward end portion of the tubular extension 43 is defined by an internally threaded counterbore at 55 for threaded connection with a reduced externally threaded portion 56 defining the outer (right) end portion of a cylindrical interfitting member 57 which projects forwardly into a blind axial bore 58 formed in the rear (right) portion of the valvular portion 41 of the valve actuator VA. A cross bore 59 passes through the full diameters of the valvular portion 41 and said interfitting member 57, for reception of a drive-pin 60 to lock them for movement as a unit. The tubular threaded portion is tightly threaded into firm connection with the confronting face on the valvular portion 41 to produce a rigid assembly thereof. The interfitting (plug) member 57 is provided with a blind axial bore 61 connected by a plurality of radial ports 62 through the wall of an annular channel 63 to serve as part of an air passage system as will appear. In the assembled status of the valve actuator best demonstrated in FIGURE 1A and 6, the outer end of the externally threaded portion 56 is axially spaced from an annular shoulder 64 defined by the point of mergence between the normal inner diameter of the tubular extension 43 and said threaded counterbore 55. Contiguously disposed with respect to said annular shoulder is a conventional resilient O-ring 65 which occupies only a portion of the axial space aforesaid. The remaining space lying between said O-ring, and the threaded end of the interfitting member 57 receives the enlarged head 66 of a composite pedal push-rod 67. The end of said head is dome-shaped and seats in a complemental concavity 68 formed in the outer end of the threaded portion 56 to have universal movement with respect thereto, said concavity defining the open end of the axial bore 61 as shown. Another blind axial bore 69 is provided in the head portion of the push-rod 67 as shown, and which opens into the axial bore 61. A plurality of cross bores 70 intersects the axial bore 69. It is thus seen that the axial bores 61, 69 and radial and cross bores 62, 70 and channel 63 provide a system of air passages to the interior of the tubular extension 43.

Figure 1A:
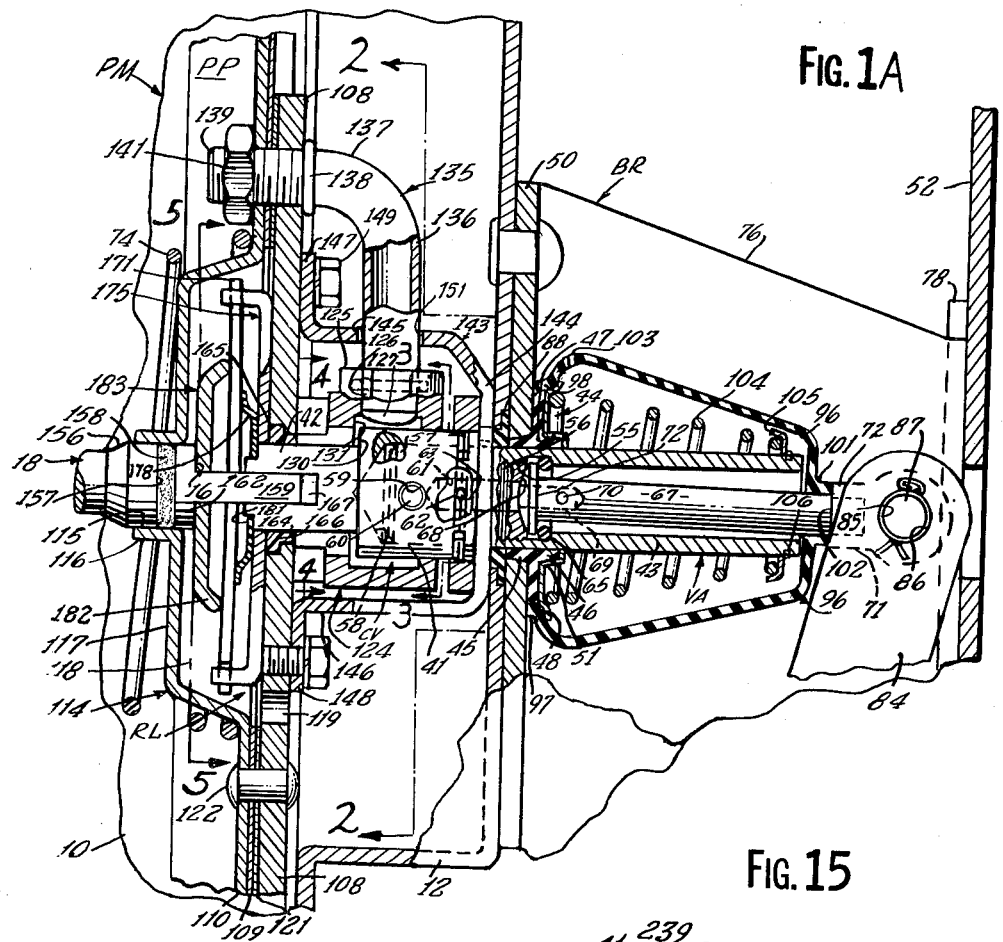
FIGURE 1A is a fragmentary sectional view taken on an enlarged scale from FIGURE 1 to clarify the detail of the improved control valve and associated working parts.

Best demonstrated in FIGURE 1A, it will be seen that said annular shoulder 64 and O-ring 65 serve to prevent axial displacement of the head 66 of the push-rod 67 therefore the push-rod itself with respect to the actuator extension 43, so that the push-rod and valve actuator VA move as a unit. The outer end of the push-rod 67 is provided with a T-shaped connection 71 which is threadedly or otherwise connected to the outer end of the push-rod as shown, either before or after the push-rod has been attached to the valve actuator VA. The push-rod may, that is the head thereof, be inserted through the O-ring accommodated by its resilience, into locking position with respect to the valve actuator with the T-shaped connector assembled on the push-rod, or the outer end of the push-rod may first be inserted through the O-ring before the tubular extension 43 is connected to the valvular portion 41, following which the T-shaped connector is attached to complete assembly of the valve actuator and push-rod. The O-ring prevents separation between the push-rod and valve actuator after once being installed as shown, since the flat surface 72 defining the opposite side of the push-rod head 66 can only compress the O-ring against the annular shoulder 64 therefore cannot radially expand it to enable the head to pass through to release the push-rod from the valve actuator.

The valve actuator VA actuates in response to an operator-operated member disclosed herein as the conventional suspended-type brake pedal "P" having a normally released position as shown in FIGURE 1. The brake pedal is connected to the valve actuator VA to actuate the same in unison therewith. A normally preloaded compression spring 74 is operably disposed wholly within the constant pressure chamber 15 of the power cylinder 10 to continuously react between the inner side of the cylinder end wall 11 and the confronting side of the power-piston PP, to urge the latter toward its normally released position as depicted in FIGURE 1A. This spring is preferably of conical configuration to nest at each end against and around annular shoulders corresponding in size to the end convolutions of said spring, said shoulders being inherently a part of the construction of the present booster apparatus as shown on the drawing, to thus stabilize the spring in operating position free of possible radial deflection during its compressive action.

Operation of the brake pedal P effects physical actuation of the valve actuator which in turn operates the control valve CV in part to induce power-activation of said booster motor PM to assist in pressurizing the brake fluid in said master cylinder MC, and thereby supply such actuating fluid to the wheel cylinders (not shown) to brake the vehicle wheels. Therefore, the fluid-displacing movement of the components in the present booster apparatus are seen to comprise the valve actuator VA, push-rod 18 and connected spool-type piston 19 movable along a common axis as demonstrated in FIGURES 1 and 6.

The mounting bracket BR is produced by a pair of side segments 75, 76 interconnected by the aforementioned end segment 50 best demonstrated in FIGURE 8, and each of these side segments is formed with an out-turned lateral flange 77, 78 respectively as the terminating rear end portions thereof. These flanges are suitably fixed to the engine side of the vehicle firewall 52, as by bolts 79, to thus mount the brake booster unit BM in its operating position. The contour of the lower edges of the two side segments is of generally V-shaped configuration, and at the apexes 81 thereof, a pair of aligned holes 82 is provided. Pivotally mounted on a shaft 83 supported at its extremes in said holes 82, is a pair of spaced upstanding actuating arms 84 which straddle the T-shaped connection 71 at their upper ends. The upper ends of these arms are provided with aligned hole 85 which register with holes 86 through the T-shaped connection, and through which holes a pin 87 passes to pivotally interconnect the arms with the pedal push-rod 67 therefore the valve actuator VA as shown to move as a unit. The seating of the dome-shaped head of the push-rod 67 for universal movement, provides the necessary oscillatory movement therefor resulting from the arcuate sweep imparted to the push-rod by the actuating arms 84, with the line of force from the arms being applied to the valve actuator VA ahead of its bearing support 88 preferably made of plastic material such as Teflon which is incorporated in the opening aforesaid provided in the end wall of the closure plate 12 as shown in FIGURE 1A. Another pair of aligned holes 91 is provided through the intermediate portion of the arms 84 through which passes a pin 92 to pivotally interconnect the forward end of a link 93 therewith, said link being pivotally connected at its opposite end to an intermediate portion of the shank of the brake pedal P as by pin 94 as shown in FIGURE 1 whereby movements of the pedal pivotally suspended at 95 on a fixed portion on the vehicle (see FIGURE 1) transmit corresponding movements to the arms 84 and valve actuator VA.

A flexible dust-excluding boot 96 encloses that portion of the tubular extension of the valve actuator which normally projects to the exterior of the closure plate 12 as shown in FIGURES 1 and 1A. The forward enlarged end of the boot terminates in an annular bead 97 which is received under radial tension in an annular channel 98 produced by the periphery of the aforesaid seal 44, and face portion of the closure plate 12 confronting an offset flanged portion 99 defining the peripheral marginal portion of said backing plate 48. The rear smaller end of the boot also terminates in an annular bead 101 which clamps around the push-rod 67 adjacent the forward end of the shank 102 of the T-shaped connection 71 adjacent the rear end of the tubular extension 43 of the valve actuator, to thus prevent foreign matter from coming in contact with either the outer or inner surfaces of the said tubular extension and connected operating parts. It is important to note that adjacent the larger end of the boot a plurality of perforations 103 is provided through the wall of the boot to serve as ports for the ingress of air to the inside of the boot. Encircling the major portion of the tubular extension 43 of the valve actuator is a normally preloaded conical-type compression spring 104 which lies wholly within the boot, and is adapted to react between the backing plate 48 and a cup-shaped abutment member 105 mounted on the tubular extension 43 adjacent the rear end thereof in abutting relationship to a split-type retaining ring 106 installed in an annular groove 107 to stabilize the member 105 whereby the spring 104 serves the novel dual purposes of maintaining the backing plate 48 under pressure to bias the lips of the seal 44 in airtight sealing relation around the outer surface of the tubular extension, and to return the valve actuator VA to its normal position as shown in FIGURES 1 and 1A upon removal of operator force from the brake pedal P. Another important advantage provided by the novel functions of spring 104 is that reaction from this spring increases as its compressive effect builds up during brake pedal actuation of the valve actuator VA in a power-activating direction which reacts against the backing plate 48 and thereby improves the sealing efficiency of the lips on the seal 44 around the actuator extension 43 to prevent power-loss due to possible leakage of air from the variable power chamber 14 thus resulting in a corresponding reduction in the effective pressure differential against the power-piston PP. Therefore, in a broader sense, the novel application of spring 104 serves as a seal activating and valve-power-piston return means.

The power-piston PP is of simplified construction and comprises a preferably circular master thrust plate 108 which backs a juxtaposed first thrust plate 109 of annular configuration, and a secondary support and sealing plate 110, the first and second plates are horizontally flared to terminate each of their peripheral marginal portions in a short vertically offset end to produce therebetween an annular channel 111 of substantially rectangular configuration. Fitted into this channel is a hollow ring-like packing member disclosed herein as a pliant tube 112, the wall of which is normally circular in cross section and characterized by resiliency, therefore deformable when installed in said rectangular channel against the inner working surface of the power cylinder 10 to maintain an effective seal therebetween and thereby isolate pressure conditions on opposite sides of the power-piston PP reciprocably mounted therein. The sealing action of the tube 112 results from a slight compressive effect of the air within the tube when the hollow area is reduced when its circular configuration is changed to a rectangular configuration in cross section. Thus, the wall of the tube is under continuous radial pressures outwardly under joint influence of both the compressive effect and the inherent tendency of the tube wall to assume its normal circular cross section.

The hollow of the tubular seal 112 may be partially filled with a suitable lubricant fed to the outer flat side of the tube seal via a plurality of minute perforations through the wall of that side, to effectively supply an appropriate amount of lubricant to the working surfaces between the tube and cylinder 10.

A central forwardly extruded embossment 114 is provided in the secondary plate 110, and which has a central circular opening 115 formed by an outturned flanged portion 116 normal to the forward vertical closure wall 117 of the embossment. A circular chamber 118 is provided between the inner side of the closure wall 117 and confronting side of the master plate 108 which serves an important purpose to be fully explained later. Chambers 14 and 118 are interconnected by a passageway 119 which passes through the master plate 108 of the power-piston assembly PP. An annular flat gasket 121 is disposed between the peripheral marginal portion of the master plate 108 and confronting surface portion on the first plate 109 for effecting sealing contact between these surfaces therefore between the associated plates. A plurality of rivets 122 is utilized to fasten the three plates aforesaid and the interposed gasket in a unitary assembly to produce the power-piston assembly PP as shown in FIGURES 1 and 1A.

The control valve mechanism CV is the follow-up type and possesses novel and improved structural and operational features heretofore not appreciated by workers in the art. As best shown in FIGURE 1A, this valve mechanism comprises an outer valve member disclosed herein as a cylindrical sleeve 124 which is axially movable as a unit with the said power-piston PP and is telescopically interfitted by the valvular portion 41 on the valve actuator VA in airtight sealed relationship thereto. This outer valve sleeve is preferably characterized by radial "floating" movement with respect to the axis of the valve actuator to prevent angulating lines of thrust producing out of parallel wear of the mating surfaces on the valvular portion 41 identified hereinbefore as a "valve piston" or "inner valve member" for flexibility in terminology, and the outer sleeve.

A centrally disposed boss 125 integrally upstands from the exterior of the valve sleeve 124, and which is provided with a hole 126 in continuous communication with an internal annular vacuum-chamber 127 which encircles the medial portion of the valve piston 41. The outer sleeve 124 is provided with a pair of diametrically opposed end slots 128 indented into its forward end best shown in FIGURE 4, and a pair of diametrically positioned cross slots 129 spaced rearwardly from the forward end to serve as air-vacuum openings (see FIGURE 3) communicating with the interior of said valve sleeve thereby interconnecting the variable pressure chamber 14 with the interior of said sleeve. The valve piston 41 is provided with an annular working land disclosed herein as the annular shoulder 130 formed at the juncture of the forward reduced portion 42 with the valve piston portion of the valve actuator best shown in FIGURE 6. This working land normally lies slightly spaced to the rear (right) of the forward annular end face 131 of the vacuum-chamber 127 as shown in FIGURES 1 and 1A to establish communication via end slots 128 between the vacuum-chamber and variable pressure chamber 14. This annular face is interrupted at diametrically opposed points as shown in FIGURES 4 and 6 by a pair of longitudinally extending pads 132 which are flush with the inner finished surface on the valve sleeve 124. These pads serve as a bearing support or guide for the forward working land portion on the inner valve element 41, thus avoiding any tendency for the critical land edge to become disaligned and therefore act as a cutting edge to produce excessive wear when moving relatively to the complemental working surface on the valve sleeve 124 leading forwardly from said annular face 131, to block vacuum communication with the variable chamber 14. A pair of diametrically opposed air cross slots 133 is provided in the valve piston 41 adjacent its end opposite the working land end best demonstrated in FIGURE 3. These air slots normally lie to the right out of registry with the air-vacuum slots 129 to block ingress of air into the variable pressure chamber 14, incursion of air to these air slots being provided through said air passage system (see FIGURES 1A and 3) comprising the aforesaid perforations 103 communicating with the interior of the boot 96, thence through the annular space within the tubular extension 43 which encircles the pedal push-rod 67, cross bores 70, axial bore 69 in the forward end of said push-rod and axial bore 61, radial ports 62 and annular channel 63 in the interfitting member 57, which intersects said air slots 133. The air-vacuum cross slots are cut transversely of the wall of the outer valve sleeve 124 to such depth that when the valve piston 41 is moved relatively to the valve sleeve as shown in FIGURE 8 to induce operation of the power-piston PP to assist in the braking operation, the pairs of cross slots 129, 133 are interconnected to enable incursion of air into the variable pressure chamber 14 to produce the different pressures on opposite sides of the power-piston PP to activate the same. Immediately prior to the cross slots 129, 133 coming into partial registry, the working land 130 on the valve piston 41 has moved slightly past the inner face of the end wall 131 to isolate the vacuum-chamber 127 from the variable pressure chamber 14, so that the constant pressure chamber 15 which is charged at all times with vacuum (negative) pressure when the engine is running, enables the raising of pressure in the variable pressure chamber 14 to move the power-piston PP to the left from normal position shown in FIGURE 1, to the position demonstrated by FIGURE 8 to pressurize the brake fluid in the master brake cylinder MC.

It is thus seen from the foregoing description of the control valve CV, that the air-vacuum slots 129 cooperate with the air slots 133 to produce what may be termed an "atmospheric-valve" generally designated "AV," and the working land 130 cooperates with the forward end wall 132 of the vacuum-chamber 127 to produce what may be termed a "vacuum-valve" designated "VV". The operating sequence of these two valves functions to maintain the constant pressure chamber 15 under vacuum pressure, and selectively controls incursion and excursion of air into and from the variable pressure chamber 14 to produce differential and equivalent pressures respectively in said chambers to operate the power-piston PP as is understood.

Interconnecting the power chamber 15 with the vacuum-chamber 127 in the valve sleeve 124, is a tubular elbow-type conduit 135 having a vertical portion 136 and the lower end of which enters the hole 126 in the upstanding boss 125 in airtight sealed relation thereto. The upper horizontal portion 137 of this conduit is provided with an outstanding circular sealing bead 138 spaced from an externally threaded terminating end portion 139. The threaded portion 139 projects through aligned holes passing through the three plates and gasket comprising the power-piston assembly PP, and a lock-nut 141 is tightly threaded on the exposed threaded portion against the secondary plate 110 to effect airtight assembly of the conduit and power-piston as shown. A generally horizontally disposed U-shaped bracket 143 is provided with a rearward end segment 144 for interconnecting spaced top and bottom legs 145, 146, respectively, which terminate forwardly in outstanding lateral flanges 147, 148, respectively, to serve as means for mounting the member 143 on the right side of the power-piston PP as by cap screws 149 best shown in FIGURES 1A and 2. The top leg is provided with an opening 151 through which the lower end of the vertical portion 136 of the conduit 135 passes into connection with the radially floating valve member 124 in the manner explained above. It should be noted, however, that the airtight fit between the lower end of the conduit 135 and hole 126 may be such as to accommodate relative radial displacement of the outer valve sleeve 124, by utilizing an annular packing confined in a complemental internal groove in the surface of the hole 126 to seal the connection between the conduit and valve member 124, or as shown by means of a "lapped" fit at their connecting points. The outer valve sleeve 124 confined between the end segment 144 and master plate 108, is of such length as to enable the aforesaid described radial adjustment according to the line of movement of the valve actuator VA, however, the dimension between the end segment 144, and thrust plate 108 may be slightly less than the length of the outer valve sleeve 124 so that when the bracket 143 is secured to the power-piston assembly PP sufficient tension is applied endwise on the valve sleeve to lock the latter and power-piston to move as a unit both radially and axially. Since the bracket 143 serves to stabilize the outer valve sleeve 124 with respect to the power-piston, this member may be termed a "valve cage" for flexibility in the terminology relating to the control valve CV.

Further considering the functions of the valve cage member 143 mounted on the power-piston PP, it should be observed that this cage not only stabilizes the outer sleeve 124 in the position shown in FIGURES 1 and 1A, but also serves as a stop for the valve actuator VA to define its normally released position by annular shoulder 152 produced at the juncture of the valvular portion 41 and tubular extension 43 disposed in abutting relationship with respect to the marginal portion of the end segment 144 which encircles an aperture 153 in said end segment through which the tubular extension 43 passes to the exterior of the closure plate 12, through complemental openings aforesaid in said plate, seal 44 and backing plate 48. It is, therefore, seen that the valve cage 143 defines the relative normal positions of the two valve members 41, 124, and abutment of the end segment 144 thereof with the inside of the closure plate 12 defines the normally released positions of the power-piston PP and valve actuator VA, which, in the broader patent sense coact to produce what may be termed a first pair of abutment-engaging portions comprising the annular shoulder 152 and confronting surface on the end segment 144 of the valve cage 143, and a second pair of abutment-engaging portions is provided by said end segment 144 disposed in engagement with the confronting inside surface on the closure plate 12 as shown in FIGURES 1–1A.

The booster push-rod 18 has an axially adjustable forward end portion 155 in engagement with the master cylinder piston 19, and the opposite rear end portion of said push-rod is formed with an enlarged diameter cylindrical portion 156 provided with an external annular groove 157 fitted with a complemental packing 158 and projects in airtight sealed relation into the opening 115 of the reaction chamber 118 aforesaid, and this portion of the push-rod terminates in a narrow extension 159 of substantially rectangular cross section to produce with the enlarged portion 156 a pair of arcuate shoulders 161, 162, one on each side of the extension 159, in the same vertical plane as shown in FIGURES 1–1A. The narrow extension is slidably received into a horizontal cross slot 163 provided in the forward end portion 42 of the valve actuator VA, the forward end of latter portion 42 being slidable between predetermined limits in a complemental aperture 164 formed through a preferably plastic bearing element 165 incorporated in a central opening 166 in the master plate 108 as shown. It should be importantly noted here that the bottom of the slot 163 is normally spaced at 167 from the confronting end of the narrow extension 159 to provide the required relative operating movement between the valve actuator VA and outer valve sleeve 124 for control valve actuation from "off" to wide open operating position. When the bottom of the slot 163 is brought into abutting relationship with the end of the push-rod extension 159, operator force may be transmitted directly to the booster push-rod 18 to operate the master brake cylinder "straight-through" in cooperation with or independently of booster assist. Movement of the valve actuator VA under operator-actuation is transmitted to the booster push-rod 18 through a reaction lever assembly generally designated by the reference character "RL," said assembly being wholly contained within the reaction chamber 118. The lever assembly comprises a plurality of radially disposed levers 171 having their outer narrowed ends 172 projecting into a slot 173 provided in each of the opposite horizontal flanges 174 defining opposite ends of a pressure transmitting U-shaped member 175 juxtaposed with respect to the master plate 108 for movement as a unit therewith. The central portion of the vertical segment 176 being apertured at 177 through which the reduced forward end portion 42 of the valve actuator VA passes from the coaxial aperture 164 in the bearing 165 aforesaid, into the chamber 118. A flat spring 178 having a central aperture 179 of substantially the same size and configuration as that described by shoulders 181 on the extreme outer ends of the bifurcated reduced portion 42, is adapted to react at opposite ends thereof against intermediate portions of the reaction levers 171 to maintain the levers in contact at their outer ends with the two pressure points provided by the bottoms of the slots 173, and their intermediate portions on their opposite sides in contact with rearwardly projecting angular legs 182 of a fulcrum member 183 having a central rectangular aperture 184 through which the narrow extension 159 passes to enable the shoulders 161, 162 to engage the forward side of the fulcrum member to provide unitary movement of the booster push-rod 18 and said latter member. This reaction lever assembly in operation is conventional, but it should be pointed out that the levers 171 divide the work between the operator and booster unit proportionally according to the ratio defined by the relative intermediate position of the fulcrum legs with respect to the levers 171. That is to say, that by raising or lowering the fulcrum contact on the levers, the division of work required of the operator and booster unit may be modified as a measure of the total reactive force from the master brake cylinder MC. Thus, the reaction assembly serves to provide the operator with proportional resistance to pedal movement so that predictable control of the brakes may be sensed to prevent erratic or over-braking tendencies.

It is thus seen that the reaction levers 171 are provided with two pressure points at their extremes respectively, and an intermediate fulcrum pressure point whereby when the booster unit is operatively energized, the inner ends of the bifurcated end portion on the valve actuator VA engage the inner ends of the reaction levers as shown in FIGURE 8, and as power is developed in the booster unit, the outer ends of the reaction levers are rocked on their respective fulcrum points by hydraulic reaction on the push-rod 18 induced as pressure build-up develops which actually moves the fulcrum member rearwardly in slightly spaced relationship with respect to the inner side of the embossment 114. In this manner the reactive forces from the master brake cylinder MC react proportionally on the power-piston PP and valve actuator VA therefore pedal P, to divide the work of stopping the vehicle as, for example, substantially 2:3 ratio between the operator and booster unit input forces, respectively.

OPERATION

In operation, and assuming the relative positions of the parts to be as shown in FIGURES 1–1A wherein the booster unit PM is in its released position, that is, the vehicle brakes are "off." The power cylinder chambers 14, 15 are at equivalent vacuum (negative) pressures and isolated from the atmosphere which is available to chamber 14 via the interior of the boot 96. Under these conditions, the booster (power) unit PM has its power-piston PP at the extreme right position under influence of the piston return spring 74 defined by the end segment 144 of the valve cage 143 in abutment with the confronting inner face on the closure wall 12, and spring 104 has retracted the valve actuator VA to normal position wherein the annular shoulder 152 abuts the inner marginal surface on the aforesaid end segment 144 of said valve cage 143, and the air slots 133 are disposed out of registry with the air-vacuum slots 129, and the annular working land 130 is spaced to the right of the end wall 131 to place the vacuum-chamber 127 in communication with the variable pressure chamber 14 whereby both of the power cylinder chambers 14, 15 are under equivalent vacuum pressures and therefore in a state of vacuum suspension in readiness for operator-actuation of the valve actuator to isolate said chambers followed by incursion of air into chamber 14 to create a pressure differential across opposite sides of the power-piston PP to activate the same in a leftward direction to operate the master brake cylinder MC therefore the wheel brakes on the vehicle to brake the wheels thereof as is understood. As previously explained, the source of constant pressure or vacuum is connected at all times to the chamber 15 via the conduit 39 and interposed check-valve CK, and the rigid tubular fitting 40. The vacuum pressure condition within said chamber 15 communicates with the variable pressure chamber 14 via conduit 135, vacuum-chamber 127, annular space between the working land 130 and end wall 131, and end slots 128 in the outer valve sleeve 124 thus maintaining the power cylinder chambers 14, 15 at vacuum pressure and the power-piston PP is held stationary under influence of spring 74, the obtaining conditions referred to in the industry with respect to this type of booster unit as being vacuum-suspended since vacuum pressures on opposite sides of the power-piston PP are equal when the booster is in inactivated status as shown in FIGURES 1–1A.

The booster unit may now be activated by applying foot pressure to the pedal P to actuate the valve actuator VA, for example, to the position shown in FIGURE 8 wherein a pressure differential is active across opposite sides of the power-piston PP resulting in its movement to the left from normal position of FIGURE 1. The operator force applied to the pedal P and the force generated by the power-piston assembly are transmitted through the push-rod 18 to the hydraulic piston 19 to actuate the brakes in a well known manner.

Initial foot pressure on the brake pedal P is transmitted to the push-rod 67 and the valve actuator VA. During such movement, the inner valve element 41 is displaced to the left relatively to the outer valve sleeve 124 as shown in FIGURE 8, such relative displacement resulting in the working land 130 being moved to the left of the end wall 131 in overlapping relationship thereto, to interrupt communication of the vacuum chamber 127 with the forward interior portion of the outer valve sleeve 124 and therefore with the end slots 128, and constant pressure chamber 15 which is continuously under vacuum (negative) pressure. Upon closure of the annular space aforesaid to interrupt vacuum communication with the variable pressure chamber 14, a momentary "lapped" status occurs with respect to the air-vacuum slots 129 and air slots 133, that is, neither air can pass through the air-vacuum slots 129 into the variable pressure chamber 14 nor can vacuum communicate with this chamber, which condition is known in the industry as the "brake holding" position when air is trapped in chamber 14 by such "lapped" condition of the control valve elements 41, 124 while the booster unit PM is operating to assist in applying the vehicle brakes. To illustrate, if the brake pedal movement is halted with the booster unit energized as shown in FIGURE 8, the power-piston PP will move slightly ahead of the operated position of the inner valve element 41 therefore the valve actuator in follow-up relationship thereto, thus disposing the end wall 131 in lapped relation to the confronting edge of the working land 130, and in synchronism therewith, the air-vacuum slots 129 are correspondingly out of registry with air slots 133 which relative positions of the control passages in the control valve CV, known as the "lapped" position traps the air in the variable pressure chamber 14 to maintain the power-piston stationary at its brake-applying position as a function of substantial counter-balance of forces acting and reacting on the power-piston PP.

The aforesaid relative displacement of the valve elements 41, 124 results in a pressure differential due to incursion of air at atmospheric level of pressure into the variable pressure chamber 14, via the perforations 103 in the dust-boot 96, interior of said boot, thence through the annular space encircling the pedal push-rod 67 within the tubular extension 43, cross bores 70, axial bore 69 in the forward head portion 66 of the said push-rod, axial bore 61 in the valve piston 41, radial ports 62, channel 63 and air-slots 133 and the air-vacuum slots 129 in the outer valve sleeve 124 into chamber 14. Movement of the power-piston PP and outer valve sleeve 124 as a unit to the left has a follow-up sequence to the inner valve piston 41 under operator-actuation. That is to say, the valve piston moves first followed by a corresponding movement substantially of the power-piston PP and connected valve sleeve 124 to a "lapping" position which is counteracted by continuing to move the inner valve piston 41, but if movement of the pedal P is halted at any position within its full operating stroke from normal position shown in FIGURE 1, the "lapped" condition of the control valve CV will occur and so maintained while the pedal P is held motionless substantially. At the same time that the inner valve piston 41 approaches "lapping" relationship with respect to the outer valve sleeve 124, the inner ends of the reaction levers 171 are engaged by the end of the bifurcated forward end portion 42 of the valve actuator VA. The outer ends of these radially extending levers pivot on the pressure points defined by the bottom of the slots 173 in opposite ends of the pressure member 175 movable with the power-piston PP as a unit, and the intermediate portions of these levers on their opposite sides act on opposite ends of the fulcrum member 183 to effect movement of and apply pressure on the booster push-rod 18.

Movement of this latter push-rod effects simultaneous movement of the hydraulic piston 19 in the master brake cylinder MC to pressurize the brake fluid to actuate the vehicle brakes as is understood.

Referring again to the radially extending reaction levers 171, and particularly to FIGURE 1A, it will be noted that the inner ends of these levers are preferably slightly spaced normally from the confronting ends of the bifurcated forward end portion 42 of the valve actuator VA. This spacing enables the first portion of initial movement of the valve actuator relative to the outer valve sleeve 124, to reach a position of lapping the working land 130 and cooperating forward end 131 of the vacuum-chamber 127 to isolate vacuum pressure from the variable pressure chamber 14 at which point the inner ends of the reaction levers 171 are engaged by the forward end of the valve actuator to impart pivotal movement to said levers and therefore to establish them in operating position to transmit reaction from the master cylinder MC upon pressure differential acting on the power-piston PP which operation results from admission of air via registering air-slots 133 and air-vacuum slots 129, into the variable pressure chamber 14 to raise the pressure therein. Thus, it may be said, that the preferred sequence of control valve operation to conditioning of the reaction levers 171 to transmit reaction from the master cylinder, is that the levers should be angulated to substantially the position shown in FIGURE 8 prior to operative energization of the booster unit PM. However, the inner ends of these reaction levers may be disposed contiguously to the bifurcated end of the valve actuator VA, and under such condition, initial movement of the valve actuator would angulate these levers on their pressure points at their outer ends on the pressure member 175, in response to relative displacement of the control valve CV to open position, thus positioning the levers 171 to transmit reaction as the valve elements 41, 124 move relatively to each other from normal relative positions to operating relative positions shown in this sequence in FIGURES 1A and 8, respectively.

Movement of the power-piston PP is transmitted to the push-rod 18 through the fulcrum member 183 acting on the levers 171 which now fulcrum about their inner ends on the bifurcated end of the valve actuator VA since the fulcrum member has reached substantially a stationary status due to operator force reacting thereagainst through the brake pedal P. The intermediate portions of the levers are exerting thrust against the outer ends of the fulcrum member which operation results in movement of the booster push-rod 18. A part of the power force according to the leverage ratio, is transmitted through the radial levers 171 rearwardly to the pedal push-rod 67 and therefore brake pedal P to the operator so that he may sense the degree of each brake application. This physical awareness on the part of the operator is commonly referred to in the industry as "brake feel."

Upon applying the brakes the required degree, movement of the pedal push-rod 67 is stopped with halting movement of the pedal. Under these conditions, the pressure differential across opposite sides of the power-piston PP causes it to assume a slightly advanced position relative to the valve actuator VA so that the working land 130 and cooperating vacuum chamber end wall 131, and the air-vacuum slots 129 and cooperating air slots 133 become disposed in "lapped" relationship which condition maintains the constant (vacuum) chamber 15 at vacuum pressure and the variable pressure chamber 14 at a pressure substantially that of the atmosphere. This is the "brake holding" position of the booster unit PM, and the brakes will remain applied as long as the foot pressure is maintained on the pedal P.

To release the brakes, foot pressure is removed from the pedal P at such rate and to such extent to provide the desired release of the brakes. During such releasing operation, the hydraulic pressure in the brake lines and wheel cylinders (not shown) urges the master cylinder piston 19 supplemented by reaction from spring 35, to move the booster push-rod 18 to the right from position of FIGURE 8 toward normal FIGURE 1 position. Since the control valve elements 41, 124 assume a "lapped" position momentarily before release, initial releasing movement of the pedal push-rod 67 and valve actuator VA as a unit following such momentary "lapped" condition, closes the air-slots 133, and cracks the space between the working land 130 and cooperating chamber end 131, to lower the pressure in the variable chamber 14 with consequent movement of the power-piston PP to the right from the position demonstrated by FIGURE 8, under influence of hydraulic pressure acting on the piston 19, and the combined reactions from springs 35, 74, and 104. If pedal movement is halted before full release thereof wherein the brakes would be "off," the power-piston PP will continue to move slightly to the right, to again position the control valve elements 41, 124 in "lapped" relative positions, thus "holding" the pressure remaining in the variable pressure chamber 14 to maintain the brakes in partially applied condition until movement of the pedal P is resumed toward its normal fully released position shown in FIGURE 1. As the pedal P is released, the valve actuator VA will move correspondingly as a unit therewith with the power-piston PP and connected outer valve element 124 in the close follow-up sequence therewith, until the pedal is fully released as shown in FIGURE 1 wherein vacuum pressures in the power cylinder chambers 14, 15 are balanced due to the vacuum-valve VV being open and the atmospheric-valve AV closed, which conditions of the control valve CV place both chambers 14–15 in communication with the vacuum source as previously explained. Since hydraulic pressure on the piston 19 falls off sharply upon initial release of the piston, the springs 35 and 74 are continuously effective to establish the power-piston PP and associated operating parts in their normal relative positions shown in FIGURES 1–1A. Thus, the aforesaid three springs insure final movement of the operating parts within the booster unit PM to released positions, and the application of springs 35, 74 herein is conventional in all respects, while the spring 104 possesses novel functional characteristics of continuously reacting on the seal 44 via the backing plate 48 and positioning the valve elements 41, 124 in their relative normal positions wherein shoulder 152 abuts the end of the segment 144 of valve cage member 143 whereupon its force teams with springs 35, 74 to bias the power-piston assembly PP to normal position shown best in FIGURE 1A. It is thus seen that spring 35 reacts on the hydraulic piston 19 which reaction is transmitted via the booster push-rod 18 to the fulcrum member 183, reaction levers 171, pressure member 175 against the master thrust plate 108, while spring 74 reacts continuously on the power-piston PP to bias the same toward its normal position, and the novel spring 104 upon release of the brake pedal P, first biases the valve element 41 therefore valve actuator VA to normal position relatively to the outer valve element 124. Upon the shoulder 152 coming into abutting relationship with the end segment 144 of the valve cage 143, this latter spring teams with the other two springs to reset the power-piston assembly in normal position as shown in FIGURE 1.

Figure 10:
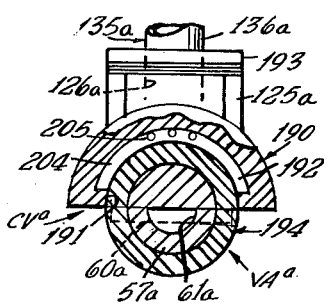
FIGURE 10 is a transverse section taken along the line 10—10 of FIGURE 9 to show certain particulars of the modified valve assembly.

*Modified control valve and operation*
*Figures 9, 10 and 11*

FIGURES 9, 10 and 11, disclose a modified form of the invention wherein the lower half of the outer valve sleeve 124 is eliminated, and all elements previously described are identified by the same reference characters distinguished, however, by suffixing the letter "a" to each.

As shown in the figures, the semicircular configuration of the upper valve element 190 defines a similarly contoured inner working surface 191 best demonstrated by FIGURES 10 and 11. Indented in this working surface is a primary vacuum-chamber 192 with which the conduit 135a communicates in the same manner as previously described in connection with the main embodiment (FIGURES 1–8). Interposed between the underside of the valve cage leg 145a and the upper end of the integrated boss 125a is a loop-type flat spring 193 adapted in the same manner shown to continuously react between the valve cage leg and valve element 190 to maintain an airtight seal between the working surface 191 and complemental upper half of the inner valve element 194, such sealing action being supplemented by pressure differential across the area of the upper valve element 190 overlying the vacuum-chamber 192 when the latter is under vacuum pressure. The modified vacuum-valve "MVV" comprises a pair of semicircular working lands 195 and 196 on the forward end working surface portion of the inner valve element 194 which are longitudinally spaced by a cross slot 197 best shown in FIGURE 11, and interconnected by a port 198 through the wall of the land 195. The two longitudinally spaced working lands cooperate respectively with a pair of similarly spaced working lands 201, 202 defined by portions at the forward end of the working surface on said outer valve element. A secondary vacuum-chamber 203 of less width but of similar arcuate configuration to the primary vacuum-chamber aforesaid is indented in spaced relation thereto, and is defined on its rear (right) side by a partition wall 204 on which working land 202 is formed, and through which passages 205 are provided to maintain communication between said spaced vacuum chambers. The lands 201, 202 are contiguous to the forward ends of both vacuum chambers as shown.

Plugged longitudinally drilled holes 206 are provided in the forward end portion of the outer valve element 190 adjacent the power-piston assembly PPª to enable processing the aforesaid holes 205.

The atmospheric-valve AVª is identical to that disclosed in the main embodiment (FIGURES 1–8) and includes only one of the air-vacuum slots 129a which cooperates with the air slot 133a connected to the air passage system leading to the perforations 103 in the dust-boot 96.

The vacuum-valve MVV, by utilizing a pair of spaced control lands cooperating respectively with a pair of interconnected vacuum chambers, is provided with the same air-flow capacity as the pairs of diametrically opposed air-vacuum and air slots 129, 133 of the main embodiment which coact with the annular valve land 131 and annular vacuum-chamber 127 to control operation of the power-piston PP.

In operation, with the valve elements 190, 194 in relative positions shown in FIGURE 9, the primary vacuum-chamber 192 is continuously charged with negative (vacuum) pressure from the booster chamber 15a via conduit 135a, and which normally communicates with the variable pressure chamber 14a via the cross slot 197 and port 198 when the booster motor PM is de-energized as shown in FIGURE 9, the end slots 128 of the main embodiment being eliminated by the lower half of the outer valve element 124 being cut away, and the plurality of passages 205 through the wall 204 which separates the vacuum-chambers 192, 203.

Relative displacement of the inner valve element 194 with respect to the semicircular outer element 190, places the pair of working lands 195, 196 in lapping relationship to the wall 204 and a portion of the working surface 191 defining working land 201. Under these conditions, the cross slot 197 and vacuum-chamber 203 are covered by their respective lands which block further communication of vacuum pressure with the variable pressure chamber 14a. Upon sufficient relative movement of the valve elements 190, 194 to place the air-vacuum slot 129a in communication with the air slot 133a while the cross slot 197 and vacuum-chamber 203 remain covered, air is introduced into the variable pressure chamber 14a to raise the pressure therein toward atmospheric level thereby creating a pressure differential across opposite sides of the power-piston PP$^a$ for power-activation thereof to assist in the fluid pressurizing operation of the master cylinder MC to actuate the brakes in the same manner as described in connection with the main embodiment (FIGURES 1-8).

It is thus seen that the aforedescribed dual working land arrangement provides the important advantage of enabling rapid ingress of vacuum pressure to the variable pressure chamber 14a to enable quick de-activation of the booster motor PM$^b$ and therefore immediate release of the vehicle brakes in synchronism with the rate of release of the pedal P, without increasing the relative operating movement normally required to operate the control valve CV disclosed in the main embodiment. It is the spacing of the working lands which cooperate to control their respective vacuum-chambers that provides the same fluid flow capacity that the annular working land 130 in the main embodiment provides in cooperation with the annular vacuum-chamber 127.

It is contemplated that this modification may utilize similarly spaced air-vacuum channels and cooperating air slots to provide the necessary air flow capacity of incursion of air at atmospheric pressure level into the variable pressure chamber 14a to create pressure differential across opposite sides of the power-piston PP$^a$ to move the same from normal position for power-assist as shown in the figures, upon isolation of the two vacuum chambers from the variable pressure chamber 14a in the manner above described.

*Modified reaction-lever mechanism and operation (FIGURES 12, 13 and 14)*

FIGURES 12, 13 and 14 disclose a modified form of a radially extending reaction lever assembly "RL$^b$" wherein the rigid characteristic of the levers 171 of the main embodiment (FIGURES 1-8) is eliminated in favor of resiliency jointly provided by a spring-lever and rubber block to transmit a progressively rather than a proportional resistance to the pedal P. All of the elements previously described are identified by the same reference characters distinguished, however, by suffixing the letter "b" to each.

As shown in the figures, a pressure plate 211 is centrally apertured at 212 to receive the reduced ends of the bifurcated portion 42b of the valve actuator VA$^b$, and is stabilized on the reduced ends by shoulders 181b to have unitary movement with the valve actuator. This plate replaces the flat stabilizing spring 178. The lower and upper ends of this plate terminate in horizontal forwardly projecting flanges 213, 214, respectively, with each flange notched at 215 to provide a pressure point generally designated 216, for the inner ends of the reaction levers generally designated 217.

Each of the reaction levers 217 is formed with an outstanding radial segment 218 normally parallel to the left side of the power-piston master plate 108b with an arcuate offset portion 219 projecting from the outer end portion toward and in contiguous relationship to said plate. The outer end portion above said offset portion is formed as a springy arch 221 terminating in an inwardly extending radial segment 222 spaced at an angle from the confronting portion of the outstanding segment. The inner end of the radial segment 222 terminates in a substantially horizontal narrower segment 223 with the end thereof spaced from the outstanding segment to provide normally a substantially triangular opening 224 adapted to receive a resilient block of rubber 225 of the same general configuration.

A channel 226 is provided in the inner end surface co-extensive with the length of the rubber block and which receives the narrow segment 223 to stabilize the rubber blocks within their respective enclosures defined by the configuration of the radial segments and connecting springy arch 221 comprising each of said levers as above described, said channel also enabling the radial segment 222 and horizontal segment 223 to have relative movement toward the outstanding segment 218 when the rubber blocks are under compression induced by the levers under reactive force from the master brake cylinder MC.

The junctures of the inwardly extending radial and horizontal segments pushes against opposite ends of a fulcrum member 227 mounted on the booster push-rod 18b in the same manner as described in connection with the main embodiment (FIGURES 1-8), but the left side of this member normally lies in contact with the inner confronting face of the embossment 114b on the secondary plate 110b as shown, and the tapered cylindrical wall of the embossment overlying the outer ends of the levers, is depressed parallelly to the axis of the booster push-rod to lie in close adjacency to the arched ends aforesaid to prevent fortuitous radial displacement of the two reaction levers, thus stabilizing them in operating position. The normal angular relationship of the radial segments of the levers is shown by FIGURE 14 wherein the radial segment 222 is angularly spaced from the left side of the rubber block, but when the levers are installed as shown in FIGURE 12, radial segments 218, 222 are biased toward each other to not only place some tension in the levers proper as required for the reactive effect desired but preferably to a minute degree in the rubber blocks. Thus, when the valve actuator VA$^b$ moves to the left from normal position, immediate resistance is encountered to pedal movement which builds up progressively as the booster unit PM$^b$ becomes increasingly energized.

In operation, with the parts in relative positions as shown in FIGURE 12, initial movement of the valve actuator VA$^b$ under operator-actuation, pushes on the inner ends of the reaction levers producing a tendency for the outstanding segments to rotate clockwise on the arcuate offset portions abutting the forward face of the master plate 108b, and at the same time the power-piston PP$^b$ under influence of pressure differential acts through said arcuate offsets to transmit movement via the radial segments 222 to the fulcrum member 227 thence to the booster push-rod 18b to move the master cylinder piston 19 for brake actuation. This combined action of operator force and power force reduces the size and modifies the shape of the opening in which the rubber blocks are disposed thus causing the rubber blocks to correspondingly deform according to its inherent consistency to resist deformation in relation to the degree of pressure acting thereon from the radial segments which adds to the resistance provided by the increasing tension building up in the lever by reaction from the master cylinder MC.

The two diametrically opposed areas 228, 229 on the secondary plate 108b in contact with the arcuate offset portions on the levers define the outer pressure points while the inner ends of the levers are acted on by the bottoms of the notches in the lower and upper notched flanges 213, 214 which serves as the inner pressure points for the levers 217 which are characterized by both resiliency, that is, capable of yielding, and lever-action, the latter characteristic effecting the deformation of the rubber blocks to produce the combined resilient resistance to pedal movement as a measure of the brake-applying operation under joint influence of operator and power forces as is understood.

*Modified valve actuator with integrated inner valve element (FIGURE 15)*

Figure 15:
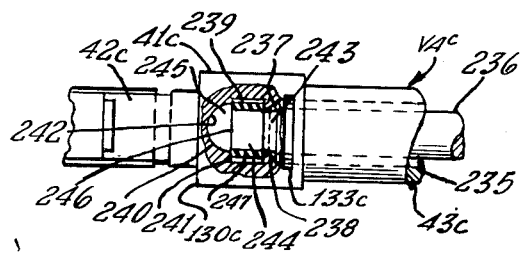
FIGURE 15 illustrates a modified valve actuator formed from a single piece of stock, and in which the annular space encircling the connected pedal push-rod conveys air directly to the atmospheric valve of the control valve mechanism.

FIGURE 15 illustrates a modified valve actuator having an integrated inner valve element 41 which eliminates the interfitting member 57, and radial ports 62, channel 63, and axial bore 61 therein and the axial and cross bores 69, 70 in the push-rod 67 so that the actuator can be processed from a single piece of bar stock, therefore providing an integral component rather than the composite actuator such as shown in the main embodiment (FIGURES 1-8). All of the elements previously described are identified by the same reference characters distinguished, however, by suffixing the letter "c" to each.

As shown in the figure, the forward end portion 42c, intermediate valvular portion 41c and the tubular extension 43c are processed from a single piece of bar stock, to produce this modified valve actuator VA^c, and comprises: an axial bore 235 which receives the pedal push-rod 236, the inner end of said bore terminates in an internal annular tapered shoulder 237 defining the right side of an internal annular flange 238, and an internal annular cavity 239 between said flange and an end wall 240 defines an annular internal shoulder 241, said wall having a semi-spherical concavity 242. The forward end portion of the push-rod 236 terminates in a tapered portion 243 which merges with a cylindrical portion 244 of the same diameter as the smaller forward end of the tapered portion, and a semi-spherical head 245 of the same diameter as the rod proper terminates said cylindrical portion and provides therewith an annular shoulder 246, said head being adapted to seat in said semi-spherical cavity for universal movement with respect thereto. The cavity 239 is fitted with a rubber grommet 247 which replaces the aforesaid O-ring 65, and normally occupies a portion of its radial space and all of the space between shoulders 241, 246. In the assembly of the push-rod, the oval head portion is pushed through the grommet while in position within the cavity 239 accommodated by its expansion to enable the oval head to pass through into seating relationship with its concave seat. Upon establishing the push-rod head in this position, the grommet retracts to normal status around the cylindrical portion 244 so that the shoulder 246 confronts the left end of the grommet, and since the right end of the grommet abuts the shoulder 241, the head cannot be withdrawn from its seated status as shown except to whatever degree which would be quite minute, compression of the grommet wall would accommodate. Thus, the push-rod 236 is locked to the valve actuator to have universal movement relative thereto, particularly a vertical arcuate motion described by the pivotal movement of the push-rod when moved by the pedal linkage as shown in FIGURE 7, and unitary axial movement so that movements of the pedal P are positively transmitted to the valve actuator in accordance with the linkage ratio between the pedal and actuator as is understood.

It should be particularly noted that this modified form of the valve actuator eliminates the interfitting member 57, cross bore 59 and locking pin 60, annular channel 63, radial ports 62, axial bore 61, registering axial bore 69 in the head end portion of the push-rod 67 and cross bores 70, all as shown and described in connection with the main embodiment (FIGURES 1-8). The annular space which encircles the push-rod 236 provides the sole passage for conveying air from the interior of the dust-boot 96 to the pair of diametrically opposed air slots 133c in the valvular portion 41c.

In summary, I have provided a brake booster device as evidenced from the foregoing disclosure that is simple and economical of construction for operative association with the conventional firewall mounted master cylinder with all problems of leakage completely solved both with respect to installation of the master cylinder on the power cylinder 10, and actuation of the tubular extension 43 of the valve actuator VA connected to the brake pedal by the push-rod 67. The vacuum and air passage systems associated with the control valve CV are extremely simple and involve no sealing problems whatsoever. The supply of vacuum and atmospheric pressures by the control valve CV may be capacitated for sensitive energization of any size booster unit PM according to the installation involved. The booster unit for the most part may be fabricated from metal stampings for economy and strength of the parts with lightness.

Another special advantage is provided by the use of the valve cage 143 for mounting the outer valve sleeve 124 on the power-piston PP for movement axially therewith as a unit. This novel arrangement enables servicing the control valve separately from the power-piston assembly for economy, and sealing of the working surfaces between the valve elements 41, 124 to improve their "lapped in" fit with use. The outer valve sleeve 124 has the capability of "floating" radially a limited degree as a unit with the inner valve portion 41 on the valve actuator VA to prevent angular lines of thrust from causing uneven and excessive wear between their complemental working surfaces with resultant leakage therebetween therefore power-loss, such angulating of the valve actuator out of a straight line path of movement usually results when the operator applies a "straight-through" operation on the master brake cylinder MC to either assist the booster unit PM or operate the brakes independently of the booster should the latter become inoperative for any reason. Under these conditions, were the outer valve sleeve 124 integrated with the power-piston assembly PP, its rigid status would induce such excessive wear on the working surfaces aforesaid for shortened service life of these two important components and therefore high cost of maintenance to keep the booster unit at its peak of operating efficiency.

Another feature, and an important one too, is the elimination of the need for lubricating the working surfaces between the operating parts. It is contemplated that the outer valve sleeve 124 would be made from a suitable molded synthetic such as "Teflon" which can be processed to close tolerances. The two bearings (bushings) in the central openings of the power-piston PP and closure wall 12 which slidably support the valve actuator VA, would be similarly processed, thus requiring no lubrication.

This booster unit is characterized by the ease with which it can be assembled and disassembled, and particularly in respect to the control valve CV, which is accomplished by merely removing three cap screws to inspect and/or replace any of the three principal parts; namely, the inner and outer valve elements 41, 124 respectively, or the support cage 143 for the outer valve element which mounts the latter element on the power-piston PP to move radially a limited degree relatively thereto and axially as a unit therewith for long service life of the present novel control valve CV.

From the foregoing description, taken in connection with the various illustrations of the different embodiments of my invention, it will be seen that certain inter-related components such as the two control valves of FIGURES 1 and 9, the two reaction transferral devices disclosed in FIGURES 1 and 12, and the three valve actuators of FIGURES 6, 11 and 15 possess simular functional characteristics respectively such that interchangeability is readily effected, to provide further beneficial results in power-assisted braking control from my novel and improved booster brake unit PN. As examples, the control valve of FIGURE 1 may have operative association with either of the disclosed reaction-lever devices, and the modified form of the control valve shown in FIGURE 9 may also have operative association with either of the reaction-lever devices, and the variations in the latter devices in leverage ratio resiliency as well as the three actuators, selectively associated therewith, combine to produce a wide range of structural variations and reactive forces for the operator to sense the degree of brake application, that can be incorporated in the present booster unit according to the requirements of the particular installation.

Reference is now made to the terminology used in the foregoing description and in the appended claims in which the identifying expressions and/or terms employed are intended to convey meanings which include the range of reasonable equivalents in the patent sense. For example, "booster," "booster motor," "booster unit," "power unit," "power cylinder," "casing," "chambers" are intended to include any means for pressurizing the brake fluid, whether such means are a solid piston or a flexible diaphragm assembly, or some other type of power assembly serving the same purpose. Directional words or characters such as "top," "bottom," "right," "left," "lower," "upper," "rear," "forward," etc., are intended to have only relative cannotation for convenience in describing the structure as it appears on the drawing, and are not intended to be interpreted as requiring any particular orientation with respect to associated structure external to the present disclosure or to the operating position thereof.

A preferred embodiment and three modifications thereof have been illustrated and described, and which are believed well calculated to fulfill the objects stated. However, it is obvious that modifications, variations, changes and substitutions may be made in the illustrated arrangement of the cooperating elements constituting the invention in commercializing processes thereof without departing from the proper scope or fair meaning of the subjoined claims.

Having thus described my invention, I claim:

1. In a booster-type motor for a brake and having a casing provided with a pair of spaced end walls having coaxial openings, respectively, and interconnected by a cylindrical wall, and a power member having a central opening coxial with said pair of openings and movable from normal position under influence of a pressure differential within said casing and providing therewith a constant pressure chamber and a variable pressure chamber, the improvement which comprises: an outer sleeve-type cylindrical valve element; a composite valve actuator including an intermediate cylindrical valvular portion telescopically projecting into said outer valve element, a forwardly projecting reduced diameter portion passing through said central opening and a rearwardly projecting elongated tubular extension, the valvular portion of said actuator and outer valve element being relatively displaceable from normal "off" position wherein the pressures within said chambers are balanced for power-inactivation of said motor, and to an operating "on" position wherein differential pressures are established in said chambers for power-activation of said motor, and complemental working surfaces defining portions of the mating faces between said valvular portion and outer valve element; an internal annular vacuum chamber indented into the mating face on the outer valve element in continuous communication with a source of vacuum production; a pair of air-vacuum channels transversely disposed through a portion of the wall of said outer valve element; an internal annular shoulder defining one end of said vacuum chamber; an annular working land defining said working surface on said valvular portion and which is adapted to selectively disconnect and connect said vacuum chamber to and from said variable pressure chamber, said land normally lying in spaced relationship to said annular shoulder to establish communication between said vacuum chamber and variable pressure chamber; a pair of air slots transversely disposed in the mating face of said valvular portion in longitudinally spaced relationship with respect to said working land portion thereof, said air slots being normally out of registry with the aforesaid air-vacuum channels when said working land is spaced from said internal annular shoulder; a blind axial bore in said valvular portion intersecting said air-vacuum channels; an interfitting member in said axial bore, and having an external annular channel in circular alignment with the said air slots; a threaded extension defining the exposed rear end portion of said interfitting member; a cross bore through the valvular portion and interfitting member; a drive-pin in said cross bore to lock said valvular portion and interfitting member to have unitary movement; an arcuate concavity in the end of the threaded extension on said interfitting member, the bottom of which defines the open end of said last-named axial bore; an internally threaded counterbored portion at the forward end of said tubular extension for threaded connection with the threaded end portion on said interfitting member to produce a unitary assembly of said valve actuator; an external annular shoulder defined by the juncture of said counterboard portion with the normal inner diameter of said tubular extension; an internal annular space in said counterbored portion defined by the threaded end of the interfitting member and internal annular shoulder in the tubular extension; a pliant annular seal in said internal annular space, and which occupies only a portion of the longitudinal length of said internal annular space; a push-rod projecting from the exterior into the said tubular extension, said push-rod having a forward enlarged head end portion provided with a planar annular shoulder merging with the rod proper, and the opposite side of said head being formed complementally to the aforesaid arcuate concavity in the threaded end of said interfitting member for seated contact therewith to have universal movement with respect to said interfitting member, said head portion being adapted to occupy the remaining space normally obtaining between said pliant seal and said confronting terminating end of the threaded end portion of the said interfitting member whereby the planar shoulder on the push-rod head abuts the said pliant seal to confine the head for prevention of axial displacement of the push-rod relative to said interfitting member; a generally U-shaped horizontally disposed cage member disposed within the variable pressure chamber aforesaid and having an open end defined by a pair of opposed flanges contiguous to said power member and defining the forward ends of a pair of spaced horizontal segments interconnected by a vertical end segment provided with a circular opening coaxial with the common axis of said outer valve element and said valvular portion and spaced from said power member to longitudinally confine the outer valve element within said cage member in abutting relationship to said end segment and confronting face portion on said power member, with the horizontal segments spaced therefrom; means for securing said cage flanges to said power member to have unitary movement therewith, the said tubular extension slidably projects rearwardly through the circular opening in said end segment and the coaxial opening in the adjacent end wall of said casing to the exterior thereof, and normally disposed with the aforesaid internal annular shoulder abutting said end segment to establishment the normal relative position of said valvular portion, and with the end segment abutting the inner confronting face portion on said casing end wall to establish the normal position of said power member; a conduit projecting at one end through the other casing end wall for interconnecting said vacuum source with the constant pressure chamber aforesaid; another conduit projecting at one end through said power member for interconnecting said constant pressure chamber with said vacuum chamber in the outer valve element; porting in the outer valve element for normally interconnecting the vacuum chamber with said variable pressure chamber; a cross slot in the said reduced diameter portion to produce a bifurcated construction thereof; a work-performing element having an intermediate portion slidably supported in a secondary opening coaxial with the central opening in said power member, with its inner end portion complementally formed to slidably enter said cross slot with the end thereof normally spaced from the bottom of said cross slot to provide the required the relative operating movement of the said valve elements, and to provide "straight-through" operator-actuation of said work element upon said operating spaced being fully taken up wherein the bottom of said cross slot and opposed end of the complemental portion abut each other; an abutment member positioned on and adjacent to the outer end of said tubular extension; sealing means encircling the tubular extension at the point of its entrance through the coaxial opening in the said adjacent end wall of said casing, and including a complemental pressure-applying plate complemental to said sealing means to effect an airtight seal around said tubular extension; spring means including a normally preloaded helically formed spring normally encircling that portion of the tubular extension exteriorily disposed with respect to said adjacent end wall of said casing, with its opposite ends reacting on said abutment member and pressure-applying plate to bias the valve actuator toward normal position, and to produce the pressure application on said plate and sealing member; an operator-operated member connected to the free end of said push-rod opposite its head end portion, and operatable from normal position to actuate said valve actuator relatively to said outer valve element to operating "on" position wherein differential pressures are effective in said constant and variable chambers to move said power member from normal position; and reaction lever mechanism for interconnecting said valve actuator and power member with said work element to divide the work thereof according to the leverage ratio effective on said work element.

2. A booster-type motor constructed in accordance with claim 1 in which said reaction lever mechanism comprises: a plurality of radially extending levers fulcrumed at their intermediate portions on an element movable as a unit with said work element, with the inner and outer ends of said levers acted on by said bifurcated end of the reduced diameter portion on said valve actuator and said power member respectively.

3. A booster-type motor constructed in accordance with claim 1 in which said working surface on said outer valve element is indented with a secondary vacuum chamber spaced forwardly from said first-named vacuum chamber and separated therefrom by said internal annular shoulder which defines said one end of said vacuum chamber first mentioned, a port through said annular shoulder interconnects said secondary and first-named vacuum chambers, a channel in the working land of said valvular portion aforesaid to provide a secondary working land spaced from said first-named working land, a port through said secondary land adapted to interconnect said last-named channel with the opposite side of said secondary working land, said spaced working lands on the valvular portion normally occupying positions spaced rearwardly of their cooperating vacuum chambers to place the latter simultaneously in communication with the said variable pressure chamber to establish equivalent pressures within said constant and variable chambers, said working lands being effective when displaced relatively to their cooperating vacuum chambers to block their communication with said variable pressure chamber by overlapping said working lands simultaneously with respect to complemental working surface portions on the outer valve element and which extend from the forward ends of both of said vacuum chambers, said pair of air-vacuum channels being connected to atmosphere via said pair of air slots respectively for incursion of air into said variable pressure chamber while vacuum pressure is blocked from entering said latter chamber in the manner described, to create differential pressures in the constant and variable chambers to move said power member from normal position.

4. A booster-type motor constructed in accordance with claim 3 wherein said outer valve element is of semi-circular cross section, and overlies a complemental working surface portion on said valvular portion of said valve actuator, and the vacuum chambers aforesaid are of similar configuration for cooperation with a transverse channel in the working land on said valvular portion to produce a pair of similarly formed working lands adapted to selectively control said primary and secondary vacuum chambers in said seimcircular outer valve element.

5. A booster-type motor constructed in accordance with claim 1 in which admission of air at atmospheric pressure to the said air slots in said interfitting member is provided by an annular space in said tubular extension encircling the said push-rod a cross bore in the head portion of said push-rod intersecting another blind axial bore opening flush with the head end of said push-rod in communication with a third blind axial bore in the aforesaid interfitting member, and a plurality of radial ports interconnecting the aforesaid external annular channel in the latter member with said third blind axial bore.

6. A booster-type motor constructed in accordance with claim 5 including a flexible protective dust-boot adapted to enclose the exposed portion of said tubular extension and the aforesaid helically formed spring encircling the same, and a plurality of minute perforations through the wall of said boot for maintaining the interior thereof at atmospheric pressure for continuous communication with the said annular space within the said tubular extension.

7. In a fluid pressure booster-type motor device comprising a cylindrical casing having spaced end walls provided with central openings, respectively, and a pressure-differential responsive unit movable therein from normal position and which divides the interior of said casing into a constant pressure chamber and a variable pressure chamber with respect to said end walls, the former chamber being connected to a source of vacuum production, the improvement which comprises: follow-up control valve mechanism mounted in part on said unit, said valve mechanism comprising: an outer valve element characterized by a tubular wall; an elongated valve actuator including a cylindrical valvular portion in interfitting relationship with respect to said tubular valve element; complemental working surfaces between said tubular element and valvular portion, said surfaces being normally spaced from each other; an internal annular vacuum chamber indented in the working surface on the tubular valve element and having continuous communication with said source of vacuum; conduit means incorporated between said pressure-responsive unit and said tubular valve element for maintaining communication between said constant pressure chamber and said vacuum chamber; an air-vacuum channel transversely incorporated through a portion of the wall of said tubular valve element; an air slot transversely incorporated in the working surface on said valvular portion and which is longitudinally spaced from the said first-named working surface thereon, said air slot being normally out of registry with the aforesaid air-vacuum channel when said working surfaces are in normally spaced relationship aforesaid; an air passage system incorporated in said valve actuator for conveying air at atmospheric pressure; longitudinally disposed bracket means mounted on said pressure-responsive unit wholly within said variable pressure chamber for stabilizing the said tubular valve element to have axial unitary movement with said pressure-responsive unit, and to accommodate limited relative axial movement of said tubular valve element; a pair of cooperating abutment-engaging portions on said bracket means and tubular valve element, respectively, for defining their relative normal positions, when engaged; another pair of cooperating abutment-engaging portions on said bracket means and motor casing, respectively, for defining the normal position of said pressure-responsive unit, when engaged; spring activated sealing means incorporated between said motor casing and valve actuator to prevent leakage from said constant and variable pressure chamber to the exterior of said motor casing, and to bias said valve actuator toward normal position; and operator-operated means operatable from normal position to displace said valve actuator relatively, from its normal position, to said tubular valve element to sequentially close the space aforesaid between said working surfaces as a function of first disposing the latter in overlapping relationship, and then placing said air-vacuum channel in communication with the atmosphere as a function of disposing said air slot in communication with said air-vacuum channel thereby creating differential pressures within said constant and variable pressure chambers to activate said pressure-responsive unit to perform work.

8. A booster-type motor device constructed in accordance with claim 7 in which said valve actuator additionally comprises: a forwardly projecting bifurcated portion produced by diminishing the diameter of said valvular portion, and slidably supported in an aperture provided through the central portion of the pressure-responsive unit; a rearwardly projecting tubular extension having its forward terminating portion provided with an internally threaded counterbore to produce an internal annular shoulder longitudinally spaced from the threaded portion; a blind axial bore in said valvular portion in the end opposite said diminished portion; an interfitting member disposed in said blind bore; means for locking the latter member to said valvular portion to move as a unit; an annular external channel in the working surface on said valvular portion in circular alignment with said air slot; another blind axial bore in said interfitting member; a plurality of radial ports through the wall of said last-named channel to connect the same to said last-named blind bore; a reduced diameter externally threaded extension defining the rear end portion of said interfitting member and is effective to join the latter member with said tubular extension to produce a unitary assembly thereof; an arcuate depression in the reduced threaded extension aforesaid into which said blind bore in said interfitting member opens; a push-rod projecting into said tubular extension substantially coextensive therewith, and having an enlarged crown head terminating its forward end portion, said head being adapted to seat in said arcuate depression to actuate the valve actuator under operator-operation; a resilient retaining ring positioned in said counterbore between the opposite flat face on said push-rod head and annular shoulder terminating the inner end of said counterbore, said retaining ring having the function of preventing axial displacement of the push-rod from its seated relationship with said arcuate depression thus providing unitary movement of said valve actuator and connected push-rod, and universal movement of said push-rod relative to said valve actuator to compensate for oscillatory movement imparted to said push-rod at its opposite exposed end connection with a pair of arms pivotally mounted on said motor casing, and which are rockable by said operator-operated means, said tubular extension being adapted to slidably project through the coaxial opening in the adjacent end wall of said casing to the exterior thereof for connection to said arms.

9. A booster-type motor device constructed in accordance with claim 8 in which said valve actuator additionally comprises: a forward projecting bifurcated portion produced by diminishing the normal diameter of one end of said valvular portion, and another rearwardly projecting elongated extension produced by diminishing the normal diameter of the opposite end of said valvular portion; a blind axial bore coextensive with said elongated extension and the major length portion of said valvular portion, said last-named blind bore intersecting said air slot; an internal annular channel formed in said last-named blind bore forwardly of said air slot to provide a pair of longitudinally spaced internal annular shoulders; an arcuate depression formed in the end wall of said last-named blind bore; a push-rod projecting through said last-named blind bore and having a complementally formed enlarged head terminating the inner end of said push-rod in engagement with said arcuate depression; an external annular channel formed in the push-rod adjacent said head in circular alignment with said-named channel, and which is defined by a flat annular shoulder spaced from a tapered annular shoulder; and a resilient grommet of annular walled configuration positioned in said annular channel in said last-named blind bore in clamping relationship around said annular channel in said push-rod to dispose opposite ends of the grommet wall in abutting relationship with the said flat shoulder on said push-rod and confronting portion of the spaced shoulder in the valvular portion opposite said flat shoulder, to lock the push-rod against relative displacement in an axial direction with respect to said valve actuator, and to enable the push-rod to have universal movement with respect to the valve actuator as a function of oscillatory movement induced at the opposite exposed end of said push-rod under influence of operator-operation.

10. A booster-type motor device constructed in accordance with claim 7 in which said tubular valve element incorporates a secondary vacuum chamber defining a pair of spaced working lands on the forward working surface thereof, with one of said lands being common to both vacuum chambers; a plurality of ports through the one land to interconnect said first-named vacuum chamber with the secondary vacuum chamber; a transversely disposed channel incorporated in the valvular portion in longitudinally spaced relation to said air slot, and defining a pair of working lands on the forward working surface thereof and normally spaced from the first-named working lands on the tubular valve element, the latter pair of working lands being adapted to cooperate with the pair of working lands, respectively, on the tubular valve element to control communication of vacuum pressure from both of said vacuum chambers simultaneously, to said variable pressure chamber and thereby accelerating the flow of vacuum pressure to said variable pressure chamber to equalize vacuum pressures within said constant and variable pressure chambers within when said pressure-responsive unit is in normal position; and a port through the forward working land defined by said transverse channel with the opposite side of the ported land so that opposite sides of the ported land are under vacuum pressure when both of said vacuum chambers are in communication with said variable pressure chamber.

11. In a fluid pressure booster-type motor comprising a cylindrical double-ended casing having aligned circular openings in said ends, respectively, and a pressure-differential responsive unit movable therein from normal position and which divides the interior of said casing into a constant pressure chamber and a variable pressure chamber, said unit being processed with a central opening coaxial with said first-named openings, the former chamber being connected to a source of vacuum production, the improvement which comprises: a composite valve actuator actuatable from normal position and having an intermediate valvular portion and reduced extensions projecting coaxially from opposite ends thereof, respectively, said valve actuator being slidably supported in the opening in said unit and one of said first-named openings; a cylindrical valvular sleeve axially movable with said pressure-responsive unit as a unit and in which said valvular portion operates with their mating working surfaces thereon in intimate air-tight sealed relation; an annular vacuum chamber incorporated between said valvular sleeve and valvular portion and having continuous communication with said source of vacuum via a conduit interconnecting said valvular sleeve and pressure-responsive unit; an air-vacuum channel transversely incorporated in the valvular sleeve; a pair of cooperating annular working lands defined by the working surfaces on said valvular sleeve and valvular portion for selectively connecting and disconnecting said vacuum chamber with respect to said variable pressure chamber in synchronism with closing and opening, respectively, of said air-vacuum channel to control operation of said pressure-responsive unit; a blind oxial bore in said valvular portion; a cylindrical interfitting member projecting into said blind bore and provided with a reduced diameter threaded portion projecting to the exterior of said valvular portion; a complementally internally threaded portion in one end of said reduced extension which projects through the actuator supporting end of said casing, to receive the threaded portion on said interfitting member to join said member and valvular portion as a unit; means for positively interlocking said interfitting member and valvular portion; an air slot transversely incorporated in said valvular portion for cooperating with said air-vacuum channel to close and open the same; an annular external channel in said interfitting member circularly aligned with said air slot; another blind axial bore in said interfitting member opening flush with the end of its reduced threaded portion; a plurality of radial ports through the wall of said last-named channel interconnecting said last-named annular channel with said last-named blind bore; a longitudinal passage through said reduced extension projecting through the last-named end of said casing for maintaining communication between the atmosphere and said last-named blind bore; an abutment adjacent the extreme outer end of said reduced extension projecting to the exterior of said last-named end of said casing; a normally preloaded spring reacting between said abutment and said last-named end of said casing to bias said valve actuator toward normal position; two pairs of abutment-engaging portions on said valvular portion and pressure-responsive unit and on the latter and the last-named end of said casing, respectively, for defining the normal relative positions of said valve acuator and pressure-responsive unit, respectively; and operator-operated means including a link interconnecting the same with said valve actuator to actuate the same from normal position in opposition to reaction from said spring.

12. In a fluid pressure booster-type motor comprising a cylindrical double-ended casing having aligned circular openings in said ends, respectively, and a pressure-differential responsive unit movable therein from normal position and which divides the interior of said casing into a constant pressure chamber and a variable pressure chamber, the former chamber being connected to a source of vacuum production, said unit being processed with a central opening coaxial with said first-named openings, the improvement which comprises: a blind axially bored unitary valve actuator actuatable from normal position and having an intermediate valvular portion and reduced extensions projecting from opposite ends thereof, respectively, said bore opening to the atmosphere and said reduced extensions projecting, through the opening in said unit and one of said first-named openings, respectively, to slidably support said valve actuator on opposite sides of its valvular portion; a cylindrical valvular sleeve axially movable as a unit with said pressure-responsive unit and in which said valvular portion on the valve actuator operates with their mating working surfaces thereon in intimate airtight sealed relationship; an annular vacuum chamber incorporated between said valvular sleeve and valvular portion and having continuous communication with said source of vacuum via a conduit interconnecting said valvular sleeve and pressure-responsive unit; an air-vacuum channel transversely incorporated in the valvular sleeve; a pair of cooperating annular working lands defined by the working surfaces on said valvular sleeve and valvular portion, respectively, for selectively connecting and disconnecting said vacuum chamber with respect to said variable pressure chamber in synchronism with closing and opening, respectively, of said air-vacuum channel to control operation of said pressure-responsive unit; an air slot transversely incorporated in said valvular portion for cooperating with said air-vacuum channel to close and open the same, said air slot intersecting the axial bore in said valve actuator; an abutment on and adjacent to the outer end of said reduced extension projecting to the exterior of said actuator supporting end of said casing; a normally preloaded spring encircling said last-named reduced extension to react between said abutment and last-named end of said casing to bias the said valve actuator toward normal position; two pairs of abutment-engaging portions on said valvular portion and pressure-responsive unit and on the latter and the last-named end of said casing, respectively, for defining the normal relative positions of said valve actuator and pressure-responsive unit respectively when said portions are engaged; and operator-operated means including a link interconnecting the same with said valve actuator for actuation of the latter from normal position in opposition to reaction from said spring.

13. In control valve mechanism adapted to control a wall movable from normal position under influence of a pressure differential, and a source of pressure different from atmosphere communicable with one side of said wall to establish said pressure differential, the improvement which comprises: a pair of relatively displaceable members, each being provided with a cylindrical surface working complementally one to the other in airtight sealed relationship; a vacuum chamber in one of said valve members normally in communication with both sides of said wall; an air-vacuum chamber disposed in the one valve member in longitudinally spaced relation to said vacuum chamber; an atmospheric channel incorporated in the working surface on said other valve member to selectively place said air-vacuum chamber in communication with vacuum pressure when said vacuum chamber is in communication with both sides of said movable wall, and to establish communication between said air-vacuum chamber and atmospheric channel when communication between said vacuum chamber and the side of said movable wall opposite its one side, is interrupted; a pair of working lands on said valve members respectively associated with said vacuum chamber for interrupting communication between the latter and said opposite side of said movable wall when said air-vacuum chamber is placed in communication with said atmospheric channel to produce differential pressures on opposite sides of said wall to move the same; a valve actuator for displacing said other valve member relatively to the one valve member under operator-actuation; and conduit means between said wall and one valve member adapted to interconnect said one side of the movable wall with said vacuum chamber in said one valve element; and means for mounting said one valve member on said movable wall to have unitary axial movement therewith.

14. In control valve mechanism adapted to control a wall movable from normal position under influence of a pressure differential, and a source of pressure different from atmosphere communicable with one side of said wall to establish said pressure differential, the improvement which comprises: a pair of relatively displaceable members, each being provided with an arcuate surface of semicircular configuration working complementally to each other in airtight sealed relationship; a pair of vacuum chambers in one of said valve members separated by a wall; a plurality of passages through said last-named wall to interconnect said vacuum chambers; a pair of working lands on said one valve member defined by the working surface portions contiguous respectively to the forward ends of said vacuum chambers; another pair of working lands on the forward end portion of said other valve member adapted to cooperate with their respective working lands on the one valve member to connect and disconnect said vacuum chambers from the one side of said movable wall; a channel in said other valve member separating said working lands thereon; a port through the wall of the end land on said other valve member to interconnect said last-named channel with the opposite side of said end working land, said working lands on said other valve member normally lying in spaced relationship to the rear of their respective cooperating lands on said one valve member, to place both vacuum chambers in communication with both sides of said movable wall; an air-vacuum chamber incorporated in said one valve member in longitudinally spaced relation to said vacuum chambers; an atmospheric channel incorporated in the working surface of said other valve member in longitudinally spaced relation to the pair of working lands thereon, to selectively place said air-vacuum chamber in communication with vacuum pressure when said vacuum chambers are in communication with both sides of said movable wall, and to establish communication between said air-vacuum chamber and atmospheric channel when communication between said vacuum chambers and the side of said movable wall opposite its one side, is interrupted thereby raising the pressure on the opposite side of said movable wall to create differential pressures on opposite sides thereof to move said movable wall; a valve actuator for displacing said other valve member relatively to the said one valve member under influence of operator-actuation; conduit means between said movable wall and one valve member to interconnect said one side of said movable wall with said vacuum chambers in said one valve member; and means for mounting the one valve member on said movable wall to have unitary axial movement therewith.

15. In control valve mechanism adapted to control a power member movable to perform work by a pressure differential, and an operator-operated member having a normally released position respectively, a pair of telecopically-related cooperating valve elements coaxially disposed with respect to the axis of said power member in operative follow-up association therewith to control the same, said valve elements being relatively displaceable from normal relative positions wherein equivalent pressures obtain across opposite sides of said power member, to operating relative positions whereat pressure differential is effective on opposite sides of said power member to move the same from normal position, and a fixed member, the improvement which comprises: a valve actuator coaxially related to the axis of said power member and adapted to actuate one of said valve elements as a unit therewith; means on said power member for mounting the other valve element to move axially as a unit therewith; a vacuum chamber indented in one of said valve elements and normally in communication with both sides of said power member; a pair of working lands on said valve elements respectively, and normally spaced from each other to establish communication between said vacuum chamber and one side of said power member; a pair of cooperating air-vacuum control openings incorporated in said valve elements respectively and normally isolated from each other when said working lands are in spaced relationship aforesaid; an air passage coaxially embodied in said valve actuator and having its inner end closed and its outer end in continuous communication with pressure at atmospheric level, and intersected adjacent its closed end by one of said air-vacuum openings whereby incursion of air at atmospheric pressure is conveyed to the other air-vacuum opening for admission to the said one side of said power member when the pair of working lands is in overlapping relationship thereby closing the space normally therebetween to isolate the vacuum chamber from the one side of said power member; a pair of cooperating abutment-engaging portions on the valve actuator and mounting means aforesaid for defining the normal relative positions of said valve elements and actuator connected to one valve element when engaged; another pair of abutment-engaging portions on said mounting means and said fixed member for defining the normal position of said power member, when engaged; a link projecting into said air passage to produce therewith an annular air space encircling said link; a universal joint interconnecting the inner end of said link to said valve actuator to move as a unit; and means interconnecting said operator-operated member to said link whereby operation of said latter member is transmitted positively to said valve actuator via said link.

16. A pressure differential booster motor adapted to actuate the hydraulic master cylinder of a brake system in part, and comprising a housing having an aperture; a movable wall in said housing producing a constant pressure chamber at one side and a variable pressure chamber at the other side; an operator-operated control member characterized by relative sliding movement in said wall between predetermined limits with a portion of the former projecting through the aperture in said housing to the exterior thereof; a valve cage having a pair of radially spaced horizontal legs interconnected at one end by a segment longitudinally spaced from said wall and movable as a unit therewith, said aperture in said end segment being coaxial with the aperture in said housing; a tubular valve member loosely occupying the longitudinal space between said wall and said end segment to have unitary axial and limited relative radial movements with respect to said wall; a cylindrical valve-forming element on a different portion of said control member adapted to project from said aperture in said end segment into slidably sealed relationship with said tubular valve member, said radial movements of the latter member compensating for axial disalignment of said control member with respect to said wall to maintain such sealed relationship therebetween; and cooperating fluid-controlling portions on said tubular valve member and valve-forming element, respectively, for admitting fluid from a source of pressure to said variable pressure chamber to create a pressure differential on said wall effective to move the latter, in response to sliding movement of said control member relative to said tubular valve member and wall within said predetermined limits.

17. A pressure differential booster motor adapted to actuate the hydraulic master cylinder of a brake system in part, and comprising a housing having an aperture; a movable wall in said housing producing a constant pressure chamber at one side and a variable pressure chamber at the other side; an operator-operated control member characterized by relative movement in said wall between predetermined limits with a portion of the former projecting through the aperture in said housing to the exterior thereof; a tubular valve member movable as a unit with said wall from a normal position of the latter; a cylindrical valve-forming element on a different portion of said control member adapted to project into and have relative movement within said predetermined limits with respect to said tubular member in sealed relationship therewith; cooperating fluid-controlling portions on said tubular member and valve-forming element, respectively, for admitting fluid from a source of pressure to said variable pressure chamber to create a pressure differential on said wall effective to move the latter, in response to relative movement of said control member with respect to said tubular member and wall, within said predetermined limits; a conical face defining the aperture in said housing; an annular resilient sealing element having opposed annular lips defining the inner peripheral portion thereof and through which the first-named portion of said control member passes to the exterior of said housing, the exterior face of one of said lips complementally projects into the conical aperture in said housing; a pressure-applying plate complementally formed with respect to the outer face of said sealing element and the other of its lips, is disposed contiguously to said sealing element to stabilize the same in sealing position and to apply radially biasing pressure inwardly on said other lip to effectively seal the same around the first-named portion of said control member and accommodate sliding movement thereof; and a normally preloaded spring normally encircling the first-named portion of said control member to react between said pressure plate and control member and thereby stabilize said sealing element in sealing position and bias said control member toward its normal position.

References Cited by the Examiner

UNITED STATES PATENTS

| | | |
|---|---|---|
| 2,949,892 | 8/60 | Ayers. |
| 2,976,846 | 3/61 | Stelzer. |
| 3,012,544 | 12/61 | Pulkownik. |
| 3,026,852 | 3/62 | Stelzer. |
| 3,037,487 | 6/62 | Brooks. |
| 3,040,535 | 6/62 | Randol _____ 91—378 |
| 3,049,100 | 8/62 | Rike. |

SAMUEL LEVINE, *Primary Examiner.*

KARL J. ALBRECHT, FRED E. ENGELTHALER, *Examiners.*